(12) United States Patent
Banks et al.

(10) Patent No.: US 7,797,342 B2
(45) Date of Patent: Sep. 14, 2010

(54) DATABASE SYSTEM PROVIDING ENCRYPTED COLUMN SUPPORT FOR APPLICATIONS

(75) Inventors: Barbara J. Banks, Berkeley, CA (US); Rajnish Kumar Chitkara, Fremont, CA (US); Shiping Chen, Pleasanton, CA (US)

(73) Assignee: Sybase, Inc., Dublin, CA (US)

( * ) Notice: Subject to any disclaimer, the term of this patent is extended or adjusted under 35 U.S.C. 154(b) by 376 days.

(21) Appl. No.: 11/840,306

(22) Filed: Aug. 17, 2007

(65) Prior Publication Data

US 2008/0033960 A1 Feb. 7, 2008

Related U.S. Application Data

(63) Continuation-in-part of application No. 10/711,929, filed on Oct. 13, 2004.

(60) Provisional application No. 60/522,233, filed on Sep. 3, 2004.

(51) Int. Cl.
*G06F 17/30* (2006.01)

(52) U.S. Cl. ............................. 707/783; 707/999.002; 707/999.009; 707/999.107; 713/166; 713/190

(58) Field of Classification Search ............... 707/1, 707/9, 10, 100, 104.1; 713/166, 182, 193
See application file for complete search history.

(56) References Cited

U.S. PATENT DOCUMENTS

| | | | |
|---|---|---|---|
| 4,375,579 A | 3/1983 | Davida et al. | |
| 5,163,097 A | 11/1992 | Pegg | |
| 5,191,611 A | 3/1993 | Lang | |
| 5,228,094 A | 7/1993 | Villa | |
| 5,606,610 A | 2/1997 | Johansson | |
| 5,737,419 A | 4/1998 | Ganesan | |
| 5,920,630 A | 7/1999 | Wertheimer et al. | |
| 5,924,094 A | 7/1999 | Sutter | |
| 5,956,400 A | 9/1999 | Chaum et al. | |
| 5,987,440 A | 11/1999 | O'Neil et al. | |
| 5,991,399 A | 11/1999 | Graunke et al. | |

(Continued)

OTHER PUBLICATIONS

A Database Encryption Solution That is Protecting Against External and Internal Threats, and Meeting Regulatory Requirements, Jul. 28, 2004.

(Continued)

*Primary Examiner*—Tim T. Vo
*Assistant Examiner*—Dangelino N Gortayo
(74) *Attorney, Agent, or Firm*—John A. Smart

(57) ABSTRACT

A database system providing encrypted column data support with decrypt default functionality. In a database system, a method providing automated encryption support for column data comprises steps of: defining Structured Query Language (SQL) extensions for creating and managing column encryption keys and database tables with encrypted column data; receiving an SQL statement specifying creation of a column encryption key; receiving an SQL statement specifying creation of a database table having particular column data encrypted with the column encryption key; receiving an SQL statement specifying a default value to be provided in response to requests for the column data without decrypt permission; in response to a subsequent database operation requesting encrypted column data from a user with decrypt permission, automatically decrypting the column data; and in response to a subsequent database operation requesting the encrypted column data from a user without decrypt permission, returning the default value.

43 Claims, 18 Drawing Sheets

U.S. PATENT DOCUMENTS

| | | | |
|---|---|---|---|
| 6,029,160 | A | 2/2000 | Cabrera et al. |
| 6,038,315 | A | 3/2000 | Strait et al. |
| 6,185,685 | B1 | 2/2001 | Morgan et al. |
| 6,233,617 | B1 | 5/2001 | Rothwein et al. |
| 6,327,595 | B1 | 12/2001 | Lyson et al. |
| 6,336,121 | B1 | 1/2002 | Lyson et al. |
| 6,360,324 | B2 | 3/2002 | Van |
| 6,446,092 | B1 * | 9/2002 | Sutter .................. 707/203 |
| 7,093,137 | B1 | 8/2006 | Sato et al. |
| 7,111,005 | B1 | 9/2006 | Wessman |
| 7,152,067 | B2 * | 12/2006 | Yagawa et al. ........... 707/10 |
| 7,155,612 | B2 | 12/2006 | Licis |
| 7,266,699 | B2 * | 9/2007 | Newman et al. ........... 713/182 |
| 7,269,729 | B2 * | 9/2007 | He et al. ................ 713/166 |
| 2001/0056541 | A1 | 12/2001 | Matsuzaki et al. |
| 2004/0255133 | A1 * | 12/2004 | Lei et al. ............... 713/193 |
| 2005/0027723 | A1 * | 2/2005 | Jones et al. ............. 707/100 |
| 2005/0198490 | A1 | 9/2005 | Jaganathan et al. |
| 2007/0079119 | A1 * | 4/2007 | Mattsson et al. .......... 713/164 |

OTHER PUBLICATIONS

Oracle Database Security Guide 10g Release 1 (10.1) Part No. B10773-01, Chapter 14, pp. 14-1 to 14-48, Dec. 2003 (See particularly "Column Masking Behavior" at 14-42 to 14-44).

* cited by examiner

DATABASE SYSTEM PROVIDING ENCRYPTED COLUMN SUPPORT FOR APPLICATIONS

CROSS REFERENCE TO RELATED APPLICATIONS

The present application is related to and claims the benefit of priority of the following commonly-owned, presently-pending nonprovisional application(s): application Ser. No. 10/711,929, filed Oct. 13, 2004, entitled "Database System Providing SQL Extensions for Automated Encryption and Decryption of Column Data", of which the present application is a Continuation-in-part application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 39672 Bytes, created: Aug. 13, 2007 3:29:12 PM; Object ID: File No. 1; Object Contents: Source code.

BACKGROUND OF INVENTION

1. Field of the Invention

The present invention relates generally to database management systems and, more particularly, to implementing methodologies for securing column data in such systems from unauthorized access.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Addison Wesley, 2000.

Over time, more and more information gets placed into databases, including personal and financial information. Additionally, government agencies have increased the number of regulations that apply to such information, especially after the events of Sep. 11, 2001. As a result, there is increasing interest in storing database information, particularly sensitive database information, in encrypted form. Ideally, such a database would encrypt information in a manner that would prevent its use, even if a physical copy of the database were lost or stolen.

Notwithstanding the increased interest in encrypting database information, existing database customers require that any new solution should allow existing database applications to continue working as is. In other words, the solution must be effectively transparent to, or compatible with, existing applications, so that existing applications can continue to work without onerous rewrites. Customers also want any proposed solution to provide basic encryption key management, thereby alleviating management complexities.

Today, there is risk to data maintained in an organization's database systems from both internal and external sources. Well-publicized news articles have reported numerous incidences of stolen credit card numbers resulting from external break-ins as well as employee incompetence (e.g., lost laptop computer). As external defenses have improved, the internal risks have become relatively more important. Organizations must contend with rogue employees who can gain access to protected databases to steal sensitive information for personal profit. See, e.g., "AOL customer list stolen, sold to spammer", MSNBC, Jun. 24, 2004 (currently archived at www.msnbc.msn.com/id/5279826). Given the high occurrence of these incidences, many database customers—especially credit card companies—are now requiring that data in the databases be encrypted so that anyone hacking into the database will be unable to get at the underlying (unencrypted) data.

Most encryption solutions today are built on database triggers and built-in encrypt/decrypt functions. Such approaches however are problematic, as they rely on special purpose triggers or client-side (i.e., database application) participation in the process. In order to encrypt data, the database application must first actually get the data (i.e., outside the database system), encrypt the data, and then store it in the database, for example as "varbinary" (variable-length binary) data. Database vendors have continually evolved infrastructure to assist the user with data encryption. Oracle, for example, provides secure stored data encryption using industry standard DES and triple DES algorithms. Oracle provides a PL/SQL (stored procedure API) package DBMS_OBFUSCATION_TOOLKIT to encrypt and decrypt stored data. However, this is only an API and requires application development to design and implement. Also, key management is programmatic as the application has to supply the encryption key. This means that the application developer has to find a way of storing and retrieving keys securely. Oracle supports column level encryption using this method.

IBM provides encryption in its DB2 Universal Database at the table level using DES and 3DES. The same key can be used for different tables or different keys can be used for different tables. IBM provides language extensions to create table to do the encryption at the table level for the DB2 Everyplace Database. IBM also offers encrypt/decrypt built-in functions in DB2. This solution allows column encryption at the level of a row. The application passes in the password in a SQL statement and all users of the built-ins use the password to encrypt/decrypt the columns. Row or cell-based encryption allows, for example, a web site to maintain credit card information where the customer can see only his or her own credit card information.

The solution still requires a lot of work to be performed on the client side, as every database client must include the program code (i.e., requires coding) that makes encryption happen. Although database triggers can be used to shift more of the coding to the database system, trigger-based approaches nonetheless require substantial change in one's underlying database schema in order to support encryption. All told, present-day solutions do not provide encryption support that is performed in an automated manner that is transparent to database applications or users (DBAs).

Because encryption is becoming increasingly important, some (non-database) vendors are now offering solutions that perform encryption at the device level. With such an approach, everything that goes into and out of a particular protected device is encrypted and decrypted. In a similar manner, some database systems encrypt the entire database file. However, this type of approach (i.e., encrypting all data) is not efficient as it entails encrypting data that is not sensitive. Since the encryption/decryption process itself may be resource intensive, a better solution is sought.

Value-added resellers (VARs) have provided after-market solutions that attempt to address the problem. Using existing database system hooks (e.g., triggers or user-defined functions), VARs have provided application generation ("app gen") products that automate the generation of program code that performs the encryption (e.g., generate code for an encryption trigger). Such a solution requires the customer to purchase a separate after-market ("add-on") product, which has limited integration with the underlying database engine (of the target database system). Importantly, the customer must spend a fair amount of time integrating the after-market product. Additionally, the approach suffers the same limitations as other "app gen" solutions: once the app gen tool has performed the generation, the DBA is left with a static schema/result. Accommodating ad hoc queries with ad hoc "where" clauses can be problematic. If it turns out that there is a flaw in the DBA's specification/configuration of the tool, then he or she may be "stuck with" that result (or must start over). Given those deficiencies, a better solution is sought.

What is needed is a solution that provides encryption support that is performed in an automated manner, yet preserves the flexibility that users expect of modern database systems. Moreover, such a solution should be implemented with underlying database engine support so that the solution has little or no impact on existing database applications. Ideally, the solution should provide support for encrypting column data of existing database applications without requiring changes to such applications. The solution should also provide protection of data privacy from the power of the system administrator or DBA. The present invention fulfills these and other needs.

SUMMARY OF INVENTION

A database system providing encrypted column data support with decrypt default functionality for using encrypted column data with existing applications is described. In one embodiment, for example, in a database system, a method of the present invention is described for providing automated encryption support for column data which handles requests for encrypted column data from users without decrypt permission, the method comprises steps of: defining Structured Query Language (SQL) extensions for creating and managing column encryption keys, and for creating and managing database tables with encrypted column data; receiving an SQL statement specifying creation of a particular column encryption key; receiving an SQL statement specifying creation of a database table having particular column data encrypted with the particular column encryption key; receiving an SQL statement specifying a default value to be provided in response to requests for the particular column data from a user without decryption permission; in response to a subsequent database operation requesting the particular column data that has been encrypted from a user with decrypt permission on the particular column data, automatically decrypting the particular column data for use by the database operation; and in response to a subsequent database operation requesting the particular column data that has been encrypted from a user without decrypt permission, returning the default value.

In another embodiment, for example, a database system of the present invention providing automated encryption support for column data is described that comprises: a parser that supports Structured Query Language (SQL) extensions for creating and managing column encryption keys, and for creating and managing database tables with encrypted column data; and an execution unit, operating in response to SQL statements parsed by the parser, for creating a particular column encryption key, for creating a database table having particular column data encrypted with the particular column encryption key, for specifying a default value to be provided in response to requests for the particular column data from a user without decryption permission; and for automatically decrypting the particular column data for use by a subsequent database operation that requests the particular column data that has been encrypted from a user with decrypt permission on the particular column data, and which provides the default value in response to a subsequent database operation requesting the particular column data from a user without decrypt permission.

DETAILED DESCRIPTION

Glossary

Figure 1:
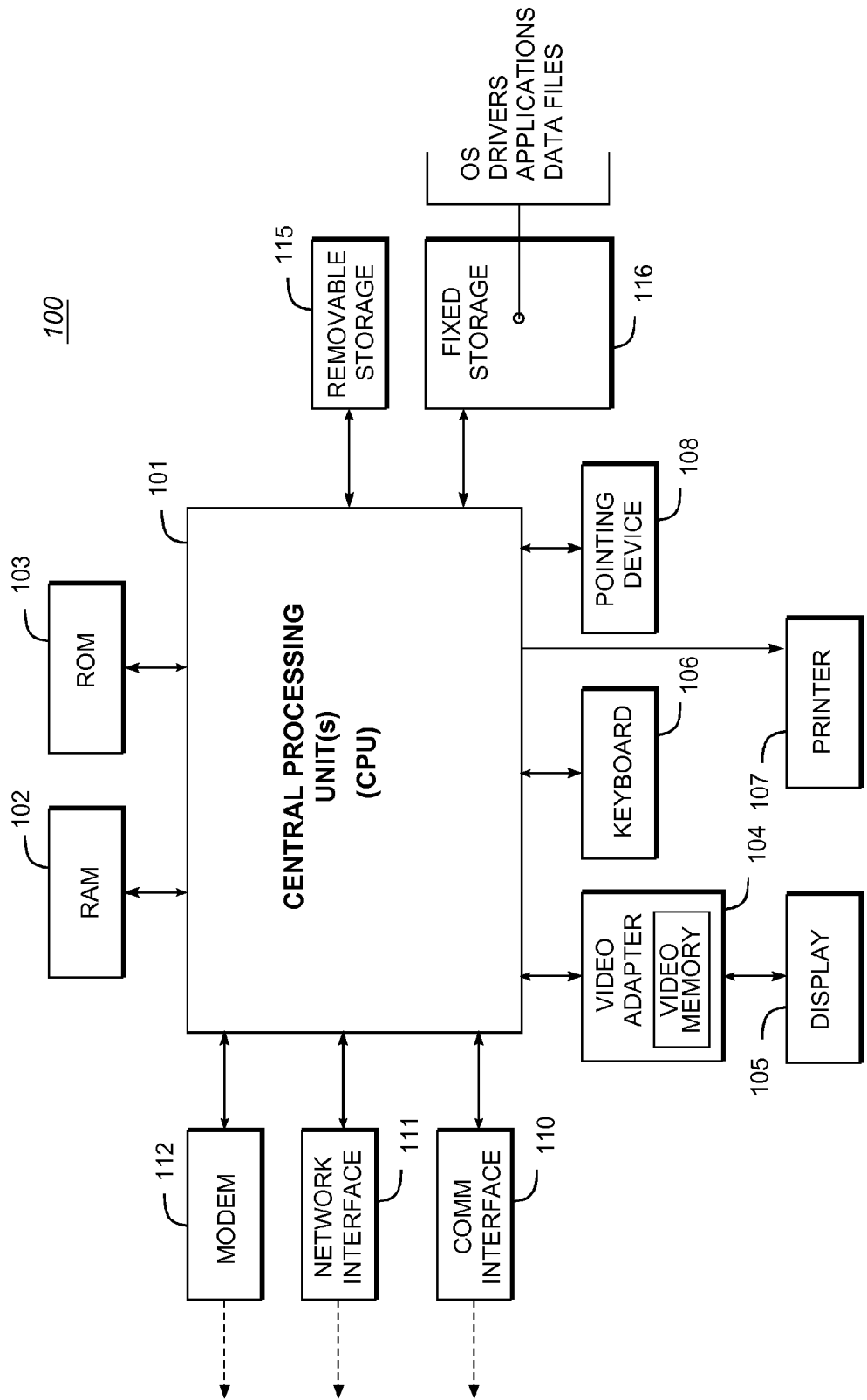
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Access control—A database management system controls access by users to data and resources based on an access control list (ACL) which lists all privileges accruing to a user or a role. Access is apportioned through the GRANT and REVOKE SQL commands. As an example, a table creator can grant permission to a user or a role to INSERT (write) data to the table or SELECT (read) data from the table. In order for a user to read from an encrypted column the user (or the role to which he belongs) must have been granted DECRYPT permission in addition to SELECT permission. If a user has SELECT permission but not DECRYPT permission the user is not allowed to see the encrypted data in plaintext form. A user who has SELECT permission without DECRYPT permission may select the encrypted data using a special mode of BCP out. For all other contexts in which a SELECT statement is entered for one or more encrypted columns, the user gets a permissions-related error or is returned a decrypt default, depending on whether the encrypted column has the decrypt default property as described below in this document. Similarly, all encrypted columns referenced in a WHERE clause require decrypt permission, unless the encrypted column has the decrypt_default property.

Cryptography—The word cryptography is derived from Greek and when literally translated, means 'secret writing'. It is the art of concealing information from unauthorized people.

Plaintext—The data to be encrypted. Plaintext is unencrypted data which is in readable form.

Ciphertext—Encrypted data which is almost impossible to read without the knowledge of a key.

Encryption Algorithm—An encryption algorithm takes a plain text message and a key and mathematically scrambles the message in such a way that the only way to unscramble the message is by using a decryption program and the correct key. An encryption algorithm is also known as a cipher.

Encryption—Encryption is the process of converting plaintext (e.g., a text message, a communication, or other data) into a coded format (i.e., from 'plaintext' into a form called 'ciphertext'), which cannot be read by other parties unless decrypted. It is the process of disguising a message or data in such a way as to hide its substance. Encryption and decryption rely on keys. The purpose of encryption is to ensure privacy by keeping information hidden from anyone for whom it is not intended, even those who have access to the encrypted data.

Decryption—Decryption is the reverse of encryption; it is the transformation of encrypted data back into an intelligible form. Decryption requires a key.

Key—Encryption and decryption generally require the use of some secret information, referred to as a key. A key is a string of bits with a length that is dependent on the encryption algorithm.

Symmetric Key—A single key used to encrypt and decrypt a message. A symmetric key is also known as a secret key.

Key Management—The various processes that deal with the creation, distribution, authentication, and storage of keys.

Block Size—The number of bits from a plaintext stream that are operated on by one "run" of the encryption algorithm. The block size can vary according to the algorithm.

Salt—In cryptography, salt consists of random bits used as one of the inputs to a key derivation function. Salt values are used to increase the work required to mount a brute-force (dictionary) attack against encryption keys.

AES—Advanced Encryption Standard, based on the Rijndael algorithm, is the approved symmetric key algorithm for FIPS-197 replacing DES. AES supports key sizes of 128 bits, 192 bits, and 256 bits and a block size of 16 bytes.

Cryptanalysis—Cryptanalysis is the flip-side of cryptography: it is the science of cracking codes, decoding secrets, violating authentication schemes, and, in general, breaking cryptographic protocols. The various techniques in cryptanalysis attempting to compromise cryptosystems are referred to as attacks.

Cryptology—Cryptology is the study of both cryptography and cryptanalysis.

One-way hash function—A one-way hash function is a technique for integrity protection which ensures that data has not been altered or manipulated. It is a function that is easy to compute in one direction but computationally infeasible to reverse compute (compute in the opposite direction). It takes a variable sized input and creates a fixed size output. One-way functions do not require cryptographic keys. The output is called the hash for the message, also known as a message digest. Any change in the input will cause a change in the result. It is almost impossible to find a different input that would produce the same hash value (i.e., create a collision).

SHA-1—Secure Hash Algorithm is a commonly used one-way hash function which takes as input a message of any length less than 264 bits and produces a 160-bit hash. SHA-1 was produced by NIST. There are currently no known cryptographic attacks against SHA-1.

Initialization Vector—An initialization vector (IV) may be applied to the first block of a plaintext stream before encryption. Without an IV, if the same key is used to encrypt two identical pieces of data then their encrypted values will be identical as well. This allows a cryptanalyst to derive meaning from observing repeated values. Use of an initialization vector insures that the cipher text is unique.

Block Cipher—A block cipher is a type of symmetric-key encryption algorithm that transforms a fixed-length block of plaintext (unencrypted text) data into a block of ciphertext (encrypted text) data of the same length. This transformation takes place under the action of a user-provided secret key. Decryption is performed by applying the reverse transformation to the ciphertext block using the same secret key. The fixed length is called the block size.

Block Cipher Mode—When a block cipher is used to encrypt a message of arbitrary length, one uses techniques known as modes of operation for the block cipher. To be useful, a mode must be at least as secure and as efficient as the underlying cipher. Modes may have properties in addition to those inherent in the basic cipher.

Electronic Code Book (ECB) Mode—In ECB mode, each plaintext block is encrypted independently with the block cipher. ECB mode is as secure as the underlying block cipher. However, plaintext patterns are not concealed. Each identical block of plaintext gives an identical block of ciphertext. The plaintext can be easily manipulated by removing, repeating, or interchanging blocks. The speed of each encryption operation is identical to that of the block cipher. ECB allows easy parallelization to yield higher performance.

Cipher Block Chaining (CBC) Mode—In CBC mode, each plaintext block is XORed with the previous ciphertext block and then encrypted. An initialization vector is used as a "seed" for the process.

Relational database—A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. A feature of a relational database is that users may define relationships between the tables in order to link data that is contained in multiple tables. The standard user and application program interface to a relational database is the Structured Query Language (SQL), defined below.

SQL—SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5)-1999), the disclosure of which is hereby incorporated by reference.

DDL—Short for Data Definition Language, a set of statements or language enabling the structure and instances of a database to be defined in a human-readable and machine-readable form. SQL, for example, contains DDL commands that can be used either interactively, or within programming language source code, to define databases and their components (e.g., CREATE and ALTER commands).

DML—Short for Data Manipulation Language, a set of statements used to store, retrieve, modify, and erase data from a database.

Database Owner (DBO)—The Database Owner (DBO) is the creator of a database or someone to whom database ownership has been transferred. A System Administrator grants users the authority to create databases with the grant command. A Database Owner logs in to database system using his or her assigned login name and password. In other databases, that owner is known by his or her regular user name. The database system recognizes the user as having the "dbo" account. A Database Owner can run a system procedure (sp_adduser) to allow other users access to the database, and use the grant command to give other users permission to create objects and execute commands within the database.

System Security Officer (SSO)—The System Security Officer (SSO) performs security-related tasks. The System Security Officer can access any database (e.g., to enable auditing) but, in general, has no special permissions on database objects. Security tasks include: Granting and revoking the System Security Officer and Operator roles; Administering the audit system; Changing passwords; Adding new logins; Locking and unlocking login accounts; Creating and granting user-defined roles; Administering network-based security; and Granting permission to use the set proxy or set session authorization commands; and Setting the password expiration interval.

System Administrator (SA)—The System Administrator (SA) handle tasks that are not specific to applications and works outside the database system's discretionary access control system. System Administrator tasks include: Managing disk storage; Monitoring the database system's automatic recovery procedure; Fine-tuning the database system by changing configurable system parameters; Diagnosing and reporting system problems; Backing up and loading databases; Granting and revoking the System Administrator role; Modifying and dropping server login accounts; Granting permissions to database system users; Creating user databases and granting ownership of them; and Setting up groups which can be used for granting and revoking permissions.

Key Custodian (KC)—The Key Custodian (KC) has the sole job of managing keys and their passwords. The KC is a user who has keycustodian_role. Keycustodian_role is a system role that grants the privilege to create encryption keys and to set the system encryption password to the holder of the role.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
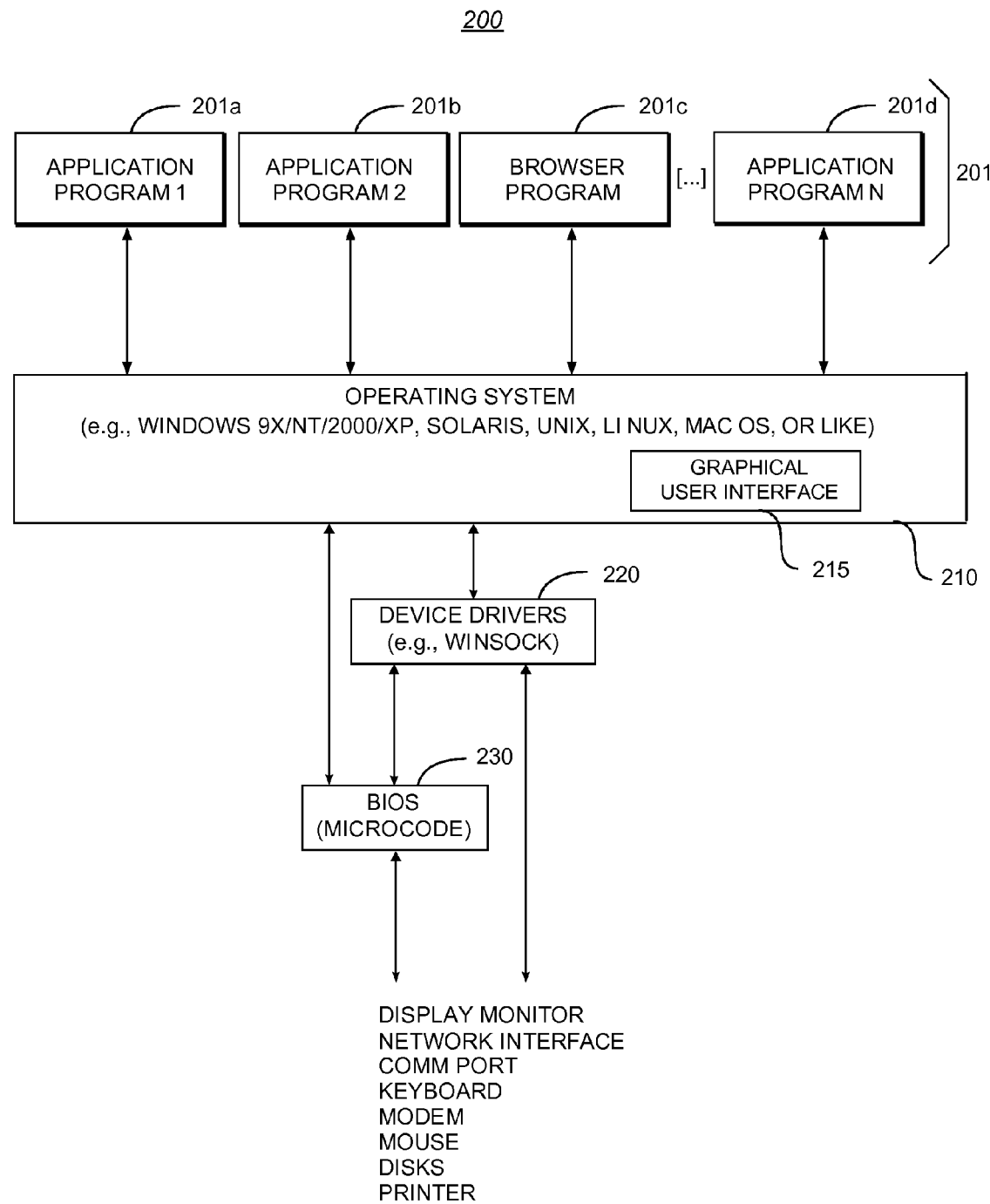
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client-Server Database Management System

Figure 3A:
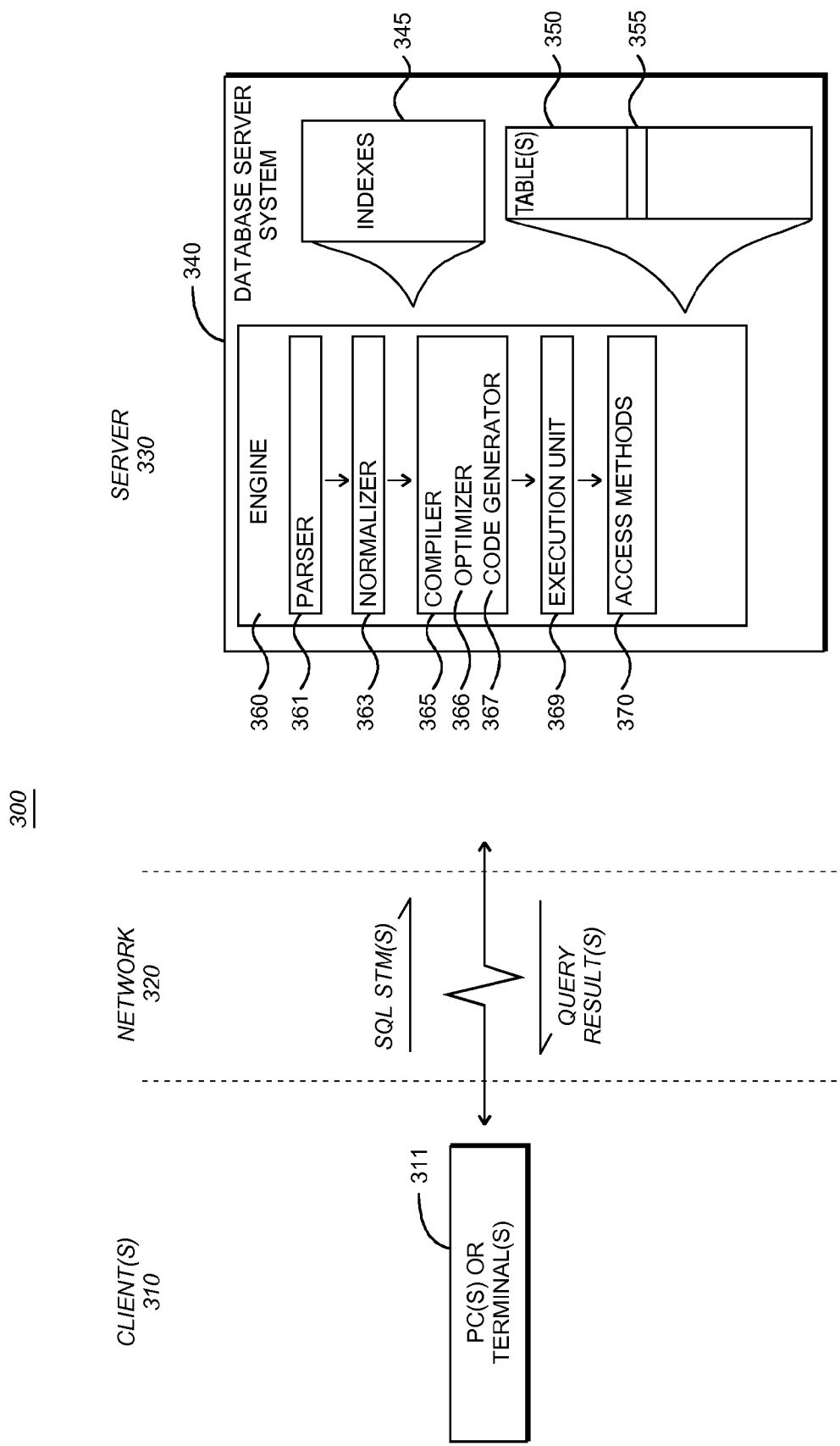
FIG. 3A illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3A illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 340, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known Structured Query Language (SQL) together with any parameter information into a format (of one or more packets) suitable for transmission to the database server system 340.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 12.5.1 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 310 store data in, or retrieve data from, one or more database tables 350, as shown at FIG. 3A. Data in a relational database is stored as a series of tables, also called relations. Typically resident on the server 330, each table itself comprises one or more "rows" or "records" (tuples) (e.g., row 355 as shown at FIG. 3A). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 310 issue one or more SQL commands to the server 330. SQL commands may specify, for instance, a query for retrieving particular data (i.e., data records meeting the query condition) from the database table(s) 350. In addition to retrieving the data from database server table(s) 350, the clients 310 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 310 (via network 320) are processed by the engine 360 of the database server system 340. The engine 360 itself comprises a parser 361, a normalizer 363, a compiler 365, an execution unit 369, and an access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). The normalizer 363 can also look-up any referential integrity constraints which exist and add those to the query. For implementation of the present invention, the normalizer also builds Protection-Check Requests (PCRs) to facilitate permissions checking when the query is executed. A list of PCR structures is attached to the query tree. For a given table the PCR list will include one Instance Protection-Check Request (IPCR) for each permission to be checked. For instance, the query "select col1 from db1.dbo.t" will generate one IPCR to check the user's permission to select from column col1 in table t. If col1 is an encrypted column, there will be a second IPCR to check the user's decrypt permission on column t.col1. The PCR structures are built during normalization but are not evaluated until the query is executed.

After normalization, the query tree is passed to the compiler 365, which includes an optimizer 366 and a code generator 367. The optimizer 366 is responsible for optimizing the query tree. The optimizer 366 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 367 translates the query execution plan selected by the query optimizer 366 into executable form for execution by the execution unit 369 using the access methods 370.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 330 maintains one or more database indexes 345 on the database tables 350. Indexes 345 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers, such as the above-described system 100, running database applications). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Providing SQL Extensions for Automated Encryption and Decryption of Column Data

Introduction

Confidentiality is the need to restrict access to sensitive and private information to people with the appropriate authorization. A good way to achieve confidentiality of data is through the use of encryption. The growth of electronic commerce has resulted in the storage of highly sensitive information, such as credit card numbers, in databases. Countries with strict national privacy laws often require organizations maintaining databases to prevent national identity numbers from being viewed, even by DBAs or system/network administrators. Companies with trade secrets, such as industrial formulas, may wish to zealously guard these valuable assets. Applications for which users are not database users may want to store "application user" passwords, or session cookies, in encrypted form in the database. Most security attacks occur in places where the data resides for long periods of time. It is becoming more important every day to encrypt especially sensitive data in the database as well as in packets flowing over the network. Highly publicized compromises of credit card numbers and personally identifiable information have prompted many organizations to consider encrypting especially sensitive data before storage in databases.

Many issues of security can be handled by a database system's authentication and access control mechanisms, ensuring that only properly identified and authorized users can access data. For applications with special requirements to secure sensitive data from view, even from DBAs, an additional mechanism to encrypt and decrypt data is needed. The ability to natively encrypt data in the server enables applications to guard their especially sensitive data on disk ("at rest"). Encryption of data prevents access by someone who has circumvented access control. Data in the database, however, cannot normally be secured against access by the database administrator (DBA), since a DBA typically has all access privileges. In order to secure sensitive data from view, even from DBAs, the encryption mechanism must be based on a password, not necessarily known or available to the DBA.

While encryption cannot address all security threats, the selective encryption of stored data can add to the security of a well-implemented application. Providing native encryption capabilities can enable application developers to provide additional measures of data security through selective encryption of stored data.

Data encryption is a top issue in today's world due to need for compliance with security legislation, examples of which include the following.

Health Insurance Portability and Accountability Act of 1996 (HIPPA). This is a federal security standard for healthcare institutions. HIPPA requires privacy protections to be applied to all health information that identifies or can be used to identify a specific individual. This act requires health care companies to protect what is called personally identifiable information (PII). All health organizations that maintain or transmit health information must establish and maintain reasonable and appropriate administrative, technical and physical safeguards to ensure integrity, confidentiality and availability of the information.

Gramm-Leach-Bliley Act (GLBA) of 1999. GLBA is a federal security standard for financial institutions. It requires agencies to establish standards relating to "administrative, technical, and physical safeguards." The federal banking agencies' guidelines to implement GLBA provisions require financial institutions to establish a comprehensive security program and consideration of specific security measures such as access controls, encryption, monitoring, and the like.

VISA and American Express (AMEX). Visa Cardholder Information Security Program (CISP) requirements include encrypting stored data and encrypting the transmission of cardholder information across open networks. AMEX's requirements include encryption in addition to audits, firewalls, and other measures.

Overview of Approach

In accordance with the present invention, a database system with an encrypted columns feature is provided. More particularly, the feature includes an SQL interface that facilitates the task of encrypting sensitive data in database tables that reside in a database. The system provides encrypted column support using language extensions and system stored procedures, in order to provide built-in encryption support that may be used in an automated, yet transparent, manner. The present invention provides a solution that is responsive to the market requirements to encrypt sensitive data on disk. The solution performs encryption at the column level instead of the row or page level, thereby minimizing the performance overhead of encryption. The functionality provided by the present invention is also simple to use. Customers simply need to mark the desired column as encrypted and create a key to be used for encryption. The table owner grants decrypt permission to users with a business need to see decrypted data. In addition, the table owner can add a decrypt_default to the encrypted column as hereinafter described so that non-privileged users do not get an error and existing applications will continue to work as is after implementation of the present invention. Basic key management is included in the system providing ease of use and decreasing TCO (total cost of ownership) because customers do not need to purchase third party software for their encryption solution. The preferred embodiment provides the encryption functionality in the server (i.e., back-end tier) as opposed to providing support for encryption in the middle tier (middleware), or any other tier. This makes the solution easier to use, does not require purchase of third party software, and enables the solution to be employed without requiring application changes. The user can specify a decrypt default value for the encrypted column so that those users who are not granted decrypt permission on the column receive a default value rather than a permissions error when they execute queries that select data from the encrypted column. Basic operation is as follows. The user (system security officer) first instructs the system to create encryption keys, which are used to encrypt the data. Next, the user creates new tables (or alters existing tables) using CREATE TABLE extended SQL syntax provided by the present invention, in order to create tables having one or more encrypted columns. In the case that an existing table is modified, the user employs ALTER TABLE extended SQL syntax of the present invention.

Optionally, the user may instruct the system to protect the column encryption keys with a user-supplied password, in order to provide additional protection. Here, a user must supply the correct password (when required) before the system allows that user to perform any operations that require encryption or decryption of encrypted column data. With password-protected encryption keys, a user seeking to decrypt data must not only have necessary privileges but also must know the password in order to be able to decrypt the data.

While the user is performing the above configuration steps, the database server system of the present invention internally stores the column encryption keys in encrypted form in the database system. During system operation, the database server will perform the automatic encryption and decryption of column data as required for database operations (e.g., in response to INSERT, UPDATE, SELECT commands). Even if the data is required indirectly (e.g., an encrypted column is required for a WHERE clause of a query), the database system will perform the automated encryption/decryption of the data, as necessary. Automated decryption of data assumes that the user has been granted decrypt permission on the column.

To the user, the built-in encryption support is transparent. For example, an encrypted Social Security Number column will appear to an authorized user as simply a normal column (e.g., CHAR(9) field type). Internally, however, the column is actually encrypted, with the data being decrypted in a transparent, automated manner as required to support the moment-to-moment operations of the database system.

System Modification to Include Encryption-Specific Modules

Figure 3B:
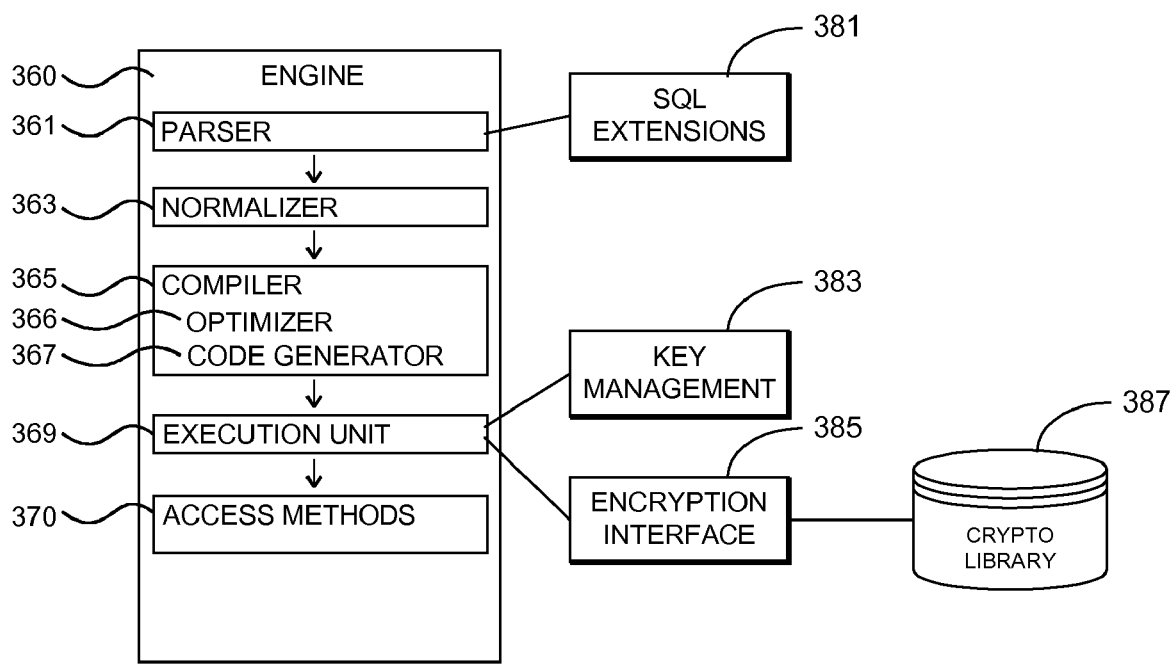
FIG. 3B is a block diagram showing specific enhancements to the system of FIG. 3A for providing automated encryption and decryption of column data through SQL Extensions.

FIG. 3B is a block diagram showing specific enhancements to the system of FIG. 3A for providing automated encryption and decryption of column data through SQL Extensions. In the currently preferred embodiment, the encryption functionality is implemented by incorporating the following additions. The parser 361 is modified in order to understand the extensions (so that the new syntax is correctly understood), as represented by SQL Extensions 381. The protection module (not separately shown) is also modified to optionally remove from the PCR list the IPCR that forces DECRYPT permission checks during execution and to instead build the decrypt permission checking into an instruction in the query plan. The protection module adds the PCR list during normalization of the query.

Once a given statement is parsed, normalized, and optimized, the resulting output is handed off to the query execution phase (e.g., Execution Unit 369). Most of the program logic implementing methodology of the present invention for built-in encryption support operates during the query execution phase. The process of managing an encryption key is performed during the query execution phase, as indicated by Key Management module 383. Therefore, the Key Management module 383 includes program logic for creating, altering, and dropping encryption keys.

Also shown, the database system is modified to include an Encryption Interface 385, which serves as an interface to a cryptographic (crypto) library 387. The Encryption Interface module 385 includes program logic for processing data manipulation, such as the INSERT, SELECT and UPDATE operations that involve encrypted columns. For example, during the processing of a SELECT query that involves an encrypted column, the Encryption Interface module 385 is responsible for translating the encrypted column from its internal type to the external or user-defined type. The underlying encryption mechanism itself can be supplied by any one of a number of commercially-available encryption libraries. Thus, the present invention itself is not tied to any particular encryption mechanism or scheme. In the currently preferred embodiment, encryption of data is symmetric (thereby avoiding the computation resources required for asymmetric encryption). Therefore, the encryption of data in columns uses symmetric keys. In the currently preferred embodiment, one key is used per column.

At the input/output (I/O) level, the encrypted data is written to disk as VARBINARY (variable binary) data. However, this itself does not require any change to the I/O methods of the database system, as the system already understands VARBINARY data. At a higher level, the database system is modified to account for the fact that the encrypted columns now have two column definitions in the system catalog: (1) external or user column definition, and (2) internal definition. The former would typically include common column type definitions, such as CHAR, VARCHAR, INTEGER, NUMERIC, and the like. The latter is VARBINARY for storing encrypted binary data. The system must maintain the user column definition so that the system knows how to use the data within queries and how to return the data back to the user (i.e., return data back as the original type).

Internal Operation

In order to implement the present invention, syntax extensions and system stored procedures have been created. These will be described in a manner that corresponds with the various tasks involved in creating, using, and managing encrypted column data.

Creating and Managing Encryption Keys

Key management includes both generation and secure storage of cryptographic keys, arguably one of the most important aspects of encryption. In the presently preferred embodiment, keys are generated using Security Builder Crypto™ (available from Certicom Corp. of Mississauga, Ontario, Canada), a standards-based toolkit. Large key sizes (at least 128 bits) are provided. Users can create keys with lengths 192 and 256 for better security.

The database system encrypts keys on disk using the AES algorithm. The vulnerability of key storage lies with the key that is used to encrypt the key. This key-encrypting key is constructed from a password. The password may be user supplied or set by the system security officer (SSO) as the "system encryption password". If user-supplied passwords are too short or easy to guess, the security of the encryption keys may be compromised. To strengthen key storage, the system accepts a hex literal as a key encryption password. The same vulnerability and solution exists for the system encryption password. The only difference is that keys encrypted by the system encryption password are still vulnerable to attacks by the System Security Officer (SSO). Note that user supplied passwords are not stored in the database. The system encryption password is stored in the database, in an encrypted form using a dynamically constructed key.

Keys can be further protected by having a limited lifetime. If the user suspects that an attacker may have obtained his key, the key should be considered compromised, and its use discontinued. The user can create another key, perform an alter table to encrypt the data with the new key, and then drop the compromised key. The creation date of a key is stored in "sysobjects" (system table) so that the user can determine how old it is and if it needs to be changed. Changing the keys generally necessitates that the table be inaccessible while the data is being decrypted and re-encrypted with a new key.

A symmetric key is created using a CREATE ENCRYPTION KEY command which, in accordance with the present invention, may be implemented with the following syntax:

```
1: CREATE ENCRYPTION KEY keyname
2:      [AS DEFAULT]
3:      [FOR algorithm]
4:      [WITH [KEYLENGTH keysize]
5:         [PASSWD passphrase]
6:            [INIT_VECTOR {NULL | RANDOM}]
7:            [PAD {NULL | RANDOM}]]
```

Any user who has KEYCUSTODIAN_ROLE or CREATE ENCRYPTION KEY permission granted to him/her by the SSO can create the key. The database system internally creates a key of the specified length using the Security Builder Crypto™ API and stores it in encrypted form in the database in the system table sysencryptkeys. Each encrypted column can have a separate key. Keys can also be shared between columns, but a column in the currently preferred embodiment has only one key.

All the information related to the keys and encryption is encapsulated inside the CREATE ENCRYPTION KEY statement. As shown, the CREATE ENCRYPTION KEY statement captures properties of the column encryption key (CEK) as well as encryption properties to be used by the encryption algorithm itself. Key properties include a keyname and keylength, and optionally a password (PASSWD) for protecting the key. The keyname must be unique in the user's table/view/procedure namespace in the current database. The SSO or the KC may use the "as default" clause to instruct the system to create a default key to be used for all encrypted columns that do not have a keyname specified in the create table/alter table statement. This is a database specific default key for use with tables in the same database. The default key is stored in the local sysencryptkeys table, in the same manner as non-default keys.

The algorithm specifies the algorithm to use for encryption. In the currently preferred embodiment, AES is used for encryption, although those skilled in the art will appreciate that other encryption algorithms may be used in place of AES. The keylength specifies the size in bits (num_bits) of the key to be created. For AES valid key lengths include 128, 192 and 256 bits. The default keylength is 128 bits.

The password (PASSWD) is a passphrase or hex literal that is used to derive a key to encrypt the key. The user should of course supply a passphrase that is not susceptible to brute force cracking. A hex literal can be used for a stronger password. A password policy may be enforced by the system to ensure the strength of chosen passwords is desirable. A database specific default password (created using sp_encryption system_encr_passwd) is used to derive a key to encrypt the symmetric encryption key if a password is not supplied. A user-specified password can protect the encrypted data from the SSO.

Using a random salt and other internal data, along with the SHA-1 hashing algorithm, the user password is transformed into a 128-bit symmetric key. This generated symmetric key is used to encrypt both the salt and the symmetric encryption key keyname. The resulting ciphertext is stored in sysencryptkeys.ekvalue. The unencrypted random salt is saved in sysencryptkeys.ekpasswd. The random salt is used to validate the password supplied for key decryption. Note that with this scheme, the password is not saved.

Encryption properties (i.e., attributes used by the encryption algorithm) include an initialization vector (INIT_VECTOR) and padding (PAD). The init_vector NULL setting instructs the database system to omit the use of an initialization vector when encrypting. This makes the column suitable for supporting an index. When an initialization vector is used by the encryption algorithm, the ciphertext of two identical pieces of plaintext will be different, which prevents a cryptanalyst from detecting patterns of data but also renders the data on disk useless for indexing or matching without decryption. The default is to use an initialization vector, that is, init_vector random. Use of an initialization vector implies using a cipher block chaining (CBC) mode of encryption; setting init_vector NULL implies the electronic code book (ECB) mode.

Symmetric encryption algorithms are block ciphers—that is, they encrypt on a block-by-block basis. A block is a defined size of bytes, such as 8 bytes, 16 bytes, or the like. If the data is less than the block size, it is padded to normalize it to the given block size. The PAD attribute allows the user to specify whether the padding is filled with empty (NULL) bytes or random (RANDOM) bytes. The PAD RANDOM attribute instructs the database system to use padding for datatypes whose length is less than one block. The advantage of random padding is that it provides an additional degree of obfuscation. Padding can be used instead of an initialization vector to randomize the ciphertext. It is only suitable for columns whose plaintext length is less than half the block length. (For the default AES algorithm the block length is 16 bytes). If both init_vector and pad are omitted by a user, the default behavior of the system is to use an initialization vector and no padding. If users want to encrypt one column using the init_vector property, for example, and want to encrypt another column without the initialization vector, they should create two separate keys, one with and one without the initialization vector, and use both keynames in the create table or alter table statement.

Example: Creating a Key and Protecting it with a Password

The user may use this key to encrypt a customer.creditcard column.

```
1: create encryption key cc_key for AES
2:   with keylength 256 passwd 'TopSecret'
3: create table customer
4:   (custid int,
5:   creditcard char(16) encrypt with cc_key)
```

When a key is encrypted using a password supplied in the create encryption key command, the password needs to be supplied to the database system before data can be encrypted or decrypted.

Example: Creating a System Encryption Password to be Used with the CREATE ENCRYPTION KEY Command The SSO may create a default system encryption password.

```
1: sp_encryption system_encr_passwd, 'GlobalPass'
```

The user may now create a key and use it to encrypt the customer.creditcard column.

```
1: create encryption key cc_key for AES
2: create table customer
3:   (custid int,
4:   creditcard char(16) encrypt with cc_key)
```

This default password is per database. When a key is encrypted using the system_encr_passwd, the password does not need to be supplied to the database system before data can be encrypted or decrypted.

Example: CREATE TABLE Statement Referencing a Key with a Fully-Qualified Name

The DBO creates a key and grants permission to use the key to Joe.

```
1: create encryption key master_key for AES
2: grant select on master_key to Joe
```

Joe creates a table specifying the key created by the DBO.

```
1: create table customer (custid int,
2:   creditcard char(16) encrypt with dbo.master_key)
```

As shown, the create statement can reference a key with a fully-qualified name. If the key was created by someone other than the table creator, the creator of the table must have been granted select permission on keyname. Note that select permission on a key applies only to the creation or alteration of encrypted columns (i.e., the create table command with the encrypt option and the alter table command with the encrypt option). Users who insert and select from encrypted columns do not need select permission on the key.

The key for column encryption can be altered using an ALTER ENCRYPTION KEY command which, in accordance with the present invention, may be implemented with the following syntax:

```
1: ALTER ENCRYPTION KEY keyname
2:   { [{AS | NOT} DEFAULT]
3:     | [WITH PASSWD 'password' | system_encr_passwd | login_passwd]
4:     MODIFY ENCRYPTION
5:       [WITH PASSWD 'newpassword' | system_encr_passwd | login_passwd]
6:     | WITH PASSWD 'password'
7:       ADD ENCRYPTION [WITH PASSWD 'keycopypassword']
8:       FOR USER username
         [ FOR RECOVERY|LOGIN_ASSOCIATION]
9:     | DROP ENCRYPTION FOR {USER username | RECOVERY}
10:    | WITH PASSWD 'recoverypasswd'
11:      RECOVER ENCRYPTION WITH PASSWD 'newpassword'
12:    | MODIFY OWNER username
```

The keyname identifies a column encryption key. The "as | not default" attribute installs or removes the keyname as the default key for the database. This attribute may not be present if the add/modify/drop/recover clause is used. If a default key already exists for the database, then keyname will replace the default key for the database and the previous default key will no longer have the default property. Subsequent alter table and create table statements will use the new default key if the keyname is omitted on the encrypt clause. Similarly, the use of the "not default" attribute removes keyname as the default for the database. Subsequent create table/alter table statements require a key name to be used on the encrypt clause. The default attribute can be changed only by the SSO or the key owner.

The "add encryption" clause is used to create a copy of the named key, encrypt it with "keycopypassword", and assign its use to a named user in the database. The purpose of a key copy is to give users access to the data through a particular key using a private password that is known only by the user. There is no limit to how many key copies can be added, but each user may be assigned only one key copy. The "for login_association" indicates that the key should be copied and later encrypted by the user's login password. Such a key copy is temporarily encrypted by the system encryption password and re-encrypted by the user's login password when the user logs in and accesses data encrypted by the named key. The "add encryption" clause instructs the database system to decrypt the base key using "password", to make a copy of the key, to encrypt the copy with a key derived from "keycopypassword" (or from the system encryption password for login_association key copies), and to save the copy in the sysencryptkeys table identified for "username". The base key is the key created on the CREATE ENCRYPTION KEY command. The "for recovery" clause tells the database system that the key copy is for use only with key recovery and not for access to data.

The "modify encryption" clause is used to modify the password of the base key or a key copy. The base key may be encrypted by the system encryption password or by a user specified password. If a key has copies, the base key must be encrypted by a user specified password. The database system modifies the password of a key or a key copy depending on whether the user executing the command is the key owner or a user who has been assigned a key copy. A key copy may be encrypted by a user specified password or by the user's login password. Thus there are two ways to encrypt a key copy by a login password: the first is where the key owner uses the "add encryption" clause with the "for login_association" clause. Using this method allows the database system to automatically encrypt the user's key copy with his login password. The second method is for the key owner to use "add encryption" to add a key copy for the user encrypted by "keycopypassword". The key owner tells the key copy assignee the password, and the key copy assignee in turn executes the alter encryption key command with the "modify encryption" clause and uses the syntax "with login_passwd" to instruct the database system to re-encrypt his key copy with his session's login password.

The "drop encryption" clause is used by the key owner to drop the key copy assigned to "username".

The "recover encryption" clause is used by the key owner to change the password on the base key without knowledge of the old password on the base key.

The "modify user" clause is used by the SSO or the current key owner to change the ownership of a key to the named user. The SSO is not permitted to specify his own username.

Example: Creating a Key Copy Encrypted by a User Specified Password

The following example illustrates allowing a user (e.g., Joe) to access a key through a private password. The command is executed by the key owner. The key owner must communicate the password on Joe's key copy to Joe.

```
1: alter encryption key cc_key with passwd "originalkeypasswd" add
   encryption with passwd "joespasswd" for user Joe
```

Joe can now change the password to the key by logging in and executing the following command:

```
1: alter encryption key cc_key with passwd 'joespasswd' modify
   encryption with passwd 'MyPassword'
```

Joe can also change the password to the key to be his login password with the following command:

```
1: alter encryption key cc_key with passwd 'joespasswd' modify
   encryption with passwd login_passwd
```

Example: Creating a Key Copy Encrypted by a Login Password

The following example illustrates allowing a user (e.g., Joe) to access a key through a login password without requiring the key owner to know Joes's login password. The command is executed by the key owner.

```
1: alter encryption key cc_key with passwd "originalkeypasswd" add
   encryption for user Joe for login_association
```

Example: Replacing the Default Key for a Database
The following command replaces the default key:

```
1: alter encryption key emp_key as default
```

Example: Setting Up a Recovery Key Copy
The following command sets up a recovery key copy for Charlie.

```
1: alter encryption key emp_key with passwd "topsecret" add
   encryption with passwd "over2charlie" for user Charlie for recovery
```

Charlie can change the password for the recovery key copy. He then saves this password in a locked drawer:

```
1: alter encryption key emp_key with passwd "over2charlie" modify
   encryption with passwd "secretofcharlie"
```

Example: Recovering the Base Key
After an unforeseen circumstance where the key owner is no longer available, the SSO can initiate the step for recovering access to the base key. He changes the key owner using the following command.

```
1: alter encryption key emp_key modify owner Marcia
```

As the new key owner, Marcia now contacts Charlie, who gives her the password of the recovery key copy. Marcia recovers access to emp_key with the following command:

```
1: alter encryption key emp_key with passwd "secretofcharlie" modify
encryption with passwd "newtopsecret"
```

In accordance with the present invention, a new datatype qualifier "encrypt" is introduced which can be used in CREATE TABLE and ALTER TABLE DDL statements. The CREATE TABLE extended syntax is defined as follows:

```
1: create table tablename
2:    (colname1 datatype [encrypt [with [db.[owner].]keyname],
3:    colname2 datatype [encrypt [with [db.[owner].]keyname])
```

This extended syntax indicates whether a column needs to be encrypted or not. (Encrypted data may make the column wider on disk.) The syntax allows the user to specify a pre-generated "keyname" that identifies a key created using the create encryption key command. The creator of the table must have select permission on keyname if the key was not created by him/her. If keyname is not supplied, the database system will look for a default key created using "create encryption key keyname as default" command.

In accordance with the present invention, a new column property "decrypt_default" is introduced, which can be used in CREATE TABLE and ALTER TABLE DDL statements. The CREATE TABLE extended syntax is defined as follows:

```
1: create table tablename
2: (colname1 datatype [encrypt [with [db.[owner].]keyname
   [decrypt_default value]],
3: colname2 datatype [encrypt [with [db.[owner].]keyname
   [decrypt_default value]])
```

This extended syntax indicates whether a decrypt_default value should be returned on a SELECT statement to a user who does not have decrypt permission on the column. If the decrypt_default clause is not specified, the behavior is to return error 10330 to a user who does not have decrypt permission without returning any data on columns which the user has permission to access.

Example: Creating a Table Customer Containing an Encrypted Column "creditcard"

In the following example the data in a column is encrypted using "cc_key". The "cc_key" encryption key should already have been created using create encryption key command.

```
1: create table customer
2:    (custid int,
3:    creditcard char(16) encrypt with cc_key)
```

For columns created using the "encrypt" qualifier, the underlying type of the column will be VARBINARY.

The database system automatically encrypts the data on DML statements (INSERT and UPDATE) just before writing the row. Users need to supply the password (if it is not the system encryption password or the user's login password) before data can be inserted because the key needs to be decrypted to encrypt the data before insertion. The database automatically decrypts the results of queries referencing encrypted columns. Users also need to provide the password (if it is not the system encryption password or the user's login password) before any statement requiring decryption of data.

Currently, data is encrypted in a canonical form (e.g., MSB for integers and IEEE/MSB encoding for floats). If encrypted on one platform, the data decrypts the same way on another platform. There is LSB/MSB processing for floating point, integer, date, datetime, money and unichar data. NULL values are not encrypted.

The ALTER TABLE extended syntax allows the user to encrypt columns in an existing table. The extended syntax is as follows:

```
1: alter table tablename modify column_name
2:    [[datatype] [null|not null]]
3:    [decrypt | encrypt [with [db.[owner].]keyname]]
```

This command encrypts existing data using a key that has been created earlier. If keyname is not supplied, the database system will find the key using the same rules as for the CREATE TABLE command.

Example: Creating an Encryption Key and Encrypting Ssn Column in Existing Employee Table An encryption key may be created and a column in an existing table (e.g., an employee table) may be encrypted as follows:

```
1: create encryption key ssn_key for AES
2: alter table employee modify ssn
3:    encrypt with ssn_key
4: grant decrypt on employee.ssn to hr_manager_role, hr_director_role
```

The alter table command processes all the rows in the table. The encryption may take a significant amount of time if the table contains a large number of rows. All future inserts into this table will automatically encrypt the data before writing on disk.

Additionally, the syntax allows the user to change the key used for an already encrypted column in a table. Keys used to encrypt a column should be changed periodically to keep the data secure. Keys can be changed by creating a new key using the create encryption key command and then using the alter table command to replace the old key with the new key. All future encryption/decryption operations will use this new key. This operation may take a significant amount of time if the table contains a large number of rows. Conversely, the syntax can also be used to remove encryption from a column in a table.

The ALTER TABLE extended syntax allows the user to specify a decrypt_default value as well as encryption on an existing table. The syntax is as follows:

```
1: alter table tablename modify column_name
2: [[datatype] [null|not null]]
3: [decrypt | encrypt [with [db.[owner].[keyname] [decrypt_default
   value]]
```

When this command is used to encrypt existing data, the decrypt_default also creates the decrypt_default and associates it with the named column.

Additionally an alternative syntax allows a decrypt default value to be added, modified or dropped to columns that are already encrypted as follows:

```
1.   alter table tablename modify column column_name
2.   replace decrypt_default value | drop decrypt_default
```

The grant decrypt command grants permission to decrypt the ssn column to employees in certain defined roles defined in the database system (e.g., hr_manager_role and hr_director_role).

Only a user who has been granted decrypt permission on an encrypted column is allowed to select the decrypted data or to search or join an encrypted column based on the decrypted value. If a column has declared a decrypt_default value, a user without decrypt permission is returned a default constant value on a select statement and an empty projection from a WHERE clause qualification on an encrypted column.

Example: Changing the Key Used to Protect customer. creditcard Column

The following is an example of the commands that are used to change the key of a given column.

```
1: create encryption key new_cc_key for AES
2: alter table customer modify creditcard int
3:    encrypt with new_cc_key
```

The user who is creating or altering the table must be the table owner and must have SELECT permission on the key. If the user cannot see the key, then he or she cannot use that key for encryption. Existing applications will not have access to encryption passwords and hence may only access data whose keys are protected by the system encryption password (system_encr_passwd).

Dropping Encryption and Keys

Encryption from an existing column can be dropped using the alter table command with the decrypt option. Only the table owner can drop encryption. This means, in effect, that the DBO or SA can drop encryption. In order to maintain the secrecy of data that is protected by a user-supplied password, the password must be supplied before execution of this command.

Example: Decrypting Previously Encrypted Data

If the encryption key was created with an explicit password and if no login password has been associated with the key, the key's password is required to be supplied. For this example, assume that encryption using cc_key was specified on the creditcard column when the customer table was created.

```
1: set encryption passwd 'w1h2o3d1u2n3n4i5t6' for cc_key
2: alter table customer modify creditcard decrypt
```

To avoid compromising the security of other keys, it is recommended that a key owner execute the alter encryption key command to modify the password on the key if the job of dropping encryption is to be done by an administrator or someone other than the key owner.

Symmetric keys can be dropped using the following:

```
1: drop encryption key keyname
```

Only key owners or the SSO can drop keys. A key can be dropped only if there are no columns in any database encrypted using the key. Offline databases cannot be checked for key references but will not cause the command to fail. A warning message naming the unavailable database will be given. When that database is brought back on line, any tables whose columns were encrypted with the dropped key will not be usable. The administrator's remedy is to load a dump of the dropped key's database from data that precedes the time when the key was dropped.

Length of Encrypted Columns

The database system calculates the maximum internal length of the encrypted column during the create/alter table operations. However, users should know the maximum length of the encrypted columns in order to make choices about schema arrangements and page sizes.

The maximum size of the VARBINARY ciphertext is a multiple of the block size of the encryption algorithm. (For AES, for example, the block size is 128 bits, or 16 bytes.) Therefore, encrypted columns will occupy a minimum of 16 bytes with additional space for:

(1) The initialization vector, which (if used) will add 16 bytes to each encrypted column. By default, keys use an initialization vector. One specifies init_vector null or init_vector random on the create encryption key command to omit or include the initialization vector.

(2) The length of the plaintext data if the column type has a varying length. The database system pre-appends the two byte length before encryption. No extra space will be used by the encrypted column unless the additional two bytes result in the ciphertext occupying an extra block.

(3) A sentinel byte appended to the ciphertext to safeguard against the database system trimming trailing zeros.

The following table shows the length of the encrypted data for a selection of column definitions and plaintext sizes. The encrypted data length is derived from the length of the ciphertext, the initialization vector, if any, and a single 'sentinel' byte.

| User-specified column type | Data length (plaintext) | Init vector? | Encrypted column type | Encrypted data length |
|---|---|---|---|---|
| int | 4 | No | varbinary(17) | 17 |
| int | 4 | Yes | varbinary(33) | 33 |
| char(15) | 15 | No | varbinary(17) | 17 |
| char(17) | 17 | Yes | varbinary(49) | 49 |
| char(17) null | 0 or 17 | No | varbinary(33) | 0 or 33 |
| varchar(15) | 10 | No | varbinary(33) | 17 |
| varchar(17) | 15 | Yes | varbinary(49) | 49 |
| varchar(17) null | 0 or 14 | No | varbinary(33) | 17 |

Creating a Default Key Encryption Password

The default key encryption password can be created by the System Security Officer (SSO) using the new stored procedure sp_encryption. The default password is specific to the database where the sp_encryption stored procedure is executed and its encrypted value is stored in the sysattributes system table in that database.

1: sp_encryption system_encr_passwd, {password| hex_literal}

The password specified using the sp_encryption command is used to encrypt all keys in that database for which a password is not specified explicitly in the create encryption key command. Users do not need to specify this password to get access to decrypted data. This is very useful for existing applications as it does not require any changes to the application.

Finding the Password to Decrypt the Encryption Key

At execution time the database system decrypts the encryption keys associated with any encrypted columns and saves the decrypted keys in the plan. Depending on how the key is encrypted, the system will find the password as follows:

1) If a key is encrypted by the system password, the system accesses that password from its encrypted form in sysattributes.

2) If a key (or key copy) is encrypted by a user specified password the user must present this password to the system before inserting, updating or selecting the column encrypted by this key. The user provides the password using the following syntax:

```
1: SET ENCRYPTION PASSWD "password" for COLUMN|KEY
   <name>
```

The password for a given key need only be set once during a user session. The system saves the supplied password in encrypted form in a memory vault until the end of the user session. Once set, the password becomes available to the system for decrypting a given encryption key used in any subsequent statement.

3) If a key copy is encrypted by a login password, the system accesses the login password from the user's session context in memory.

Recovering from Lost Passwords

The database system provides a way to recover column encryption keys after passwords have been lost. This is done using a recovery key copy of the encryption key. The following command generates a recovery key copy:

```
1: alter encryption key keyname_
2:    with passwd 'keypasswd' add encryption with passwd
      'keyrecoverypasswd'
3.    for user username for recovery"
```

The algorithm is the previously described encryption algorithm. The passwd 'keyrecoverypasswd' will be used to encrypt a copy of the key.

Protection against lost passwords works as follows. The key custodian creates the base key and adds the recovery key copy. The key custodian gives the password of the recovery key copy to a person designated as the key recoverer. The only responsibility of the key recover is to safeguard the password of the key recovery key. The key recoverer may modify the recovery key copy to encrypt it with a password known only to him, using the alter encryption key syntax already described. Then, in the event of a lost password on the base key, the key custodian contacts the key recoverer uses the password saved by the key recoverer to recover access to the base encryption key. The SSO can assign a new key owner to carry out this command if the original key owner is not available.

To recover key access the key custodian issues the following command. The database system decrypts the recovery key copy to obtain the raw encryption key. The system re-encrypts the raw key with the new password and overwrites the base key with this new encrypted value.

```
1: alter encryption key keyname with passwd 'keyrecoverypasswd'
2:    recover encryption with passwd 'newpasswd'
```

Restrictions of Encrypted Columns

In the currently preferred embodiment of the present invention, encrypted columns are subject to some of the restrictions described below. Referential integrity can be efficiently supported provided the columns are encrypted with no initialization vector (init_vector null) and no random padding (pad null) and the key is shared between the primary and foreign columns. Also, encrypted columns are generally not usable in triggers because the inserted and deleted columns for encrypted columns will contain ciphertext.

Encrypted columns will typically not make efficient SARGs (search arguments) because each row will need to be decrypted to match the SARG. If the column encryption is specified to omit the initialization vector (init_vector null) and no random padding (pad null) is used, the SARG can be encrypted once, increasing the efficiency of the search. Indexes may be created on encrypted columns if the encryption is specified at the column level with no initialization vector or random padding. A create index command on an encrypted column with an initialization vector will result in an error. Indexes on encrypted columns are generally useful only for equality/non-equality matches and not for range searches. Currently, there is no method to transmit the encryption password to a remote site. As a result, server to server RPCs (remote procedure calls) are presently limited to providing access only to those keys encrypted with the default password.

Stored Procedures

Several stored procedures are provided in the currently preferred embodiment of the present invention to facilitate performance of various operations. The sp_encryption command generally can only be run by the SSO. As described above, the general syntax of this command is as follows:

```
1: sp_encryption <command>, [option1 [,option2 [, option3, option4]]]
```

The sp_encryption stored procedure can be used to perform several operations. For example, it can be used to create the system default password as follows:

```
1: sp_encryption system_encr_passwd, 'passwd'
```

It can also be used to reset the system default password as illustrated below:

```
1: sp_encryption system_encr_passwd, 'newpasswd', 'oldpasswd'
```

Information about keys may also be obtained using stored procedures provided by the database system. Note that only those users who have select permission on a given key can obtain the information about the key. Other users will get a permissions error. For example, the following command may be used:

```
1: sp_encryption help [, keyname [,display_cols]]
```

In response to sp_encryption help, the system displays information about all keys in the current database for which the executing user has select permission. In response to sp_encryption help, keyname, the system displays keyname, keylength, encryption algorithm, use of system_encr_passwd (Y/N), use of initialization vector (Y/N), and use of random padding (Y/N). Information is also provided about whether the key is used for login access (Y/N), or is a default (Y/N). The display_cols option is available only to system security officer or the key custodian. If the display_cols option is specified, column information (db.owner.table.col information) for all columns encrypted with keyname is displayed.

The sp_help tablename procedure provides for displaying for each column whether it is encrypted or not.

System Tables

The syscolumns system table of the database is extended to include the following new columns.

| New Column Name | Datatype | Description |
| --- | --- | --- |
| Encrtype | Int null | type of data on disk |
| Encrlen | Int null | length of encrypted data |
| Encrkeyid | Int null | object id of key |
| Encrkeydb | Smallint null | dbid of key |
| Encrdate | Datetime null | Creation date copied from sysobjects.crdate |

Keys are database objects and, therefore, the system creates an entry into the sysobjects system table for each key with a type "EK" for encryption keys. The crdate, which gives the creation date of the key is copied into syscolumns.encrdate when the encrypted column is created. For cross-database key references, the syscolumns.encrdate must match the sysobjects.crdate.

A database specific sysencryptkeys system catalog is also provided in the currently preferred embodiment with columns as follows.

| Column Name | Type | Description |
| --- | --- | --- |
| ekid | int | Object id of key |
| ekuid | int null | User ID for login access |
| eklen | smallint | User-specified length of key |
| ekvalue | varbinary(256) | Encrypted value of key |
| ekpasswd | varbinary(20) null | Salt and internal version number |
| ekpublic | varbinary(128) null | Not currently used |
| ekpairid | int null | not currently used |
| ekalgorithm | int | Encryption algorithm associated with key |
| ektype | smallint | Type of key in row (default, base key, key copy) |
| ekstatus | Int | Status field |

Each symmetric created in a given database, including the default key, has an entry in the sysencryptkeys system table. For the purposes of this discussion, this initial row is referred to as the "base key". There may be additional rows to store encryption of copies of the symmetric key by a different password, as described above. These additional rows are called "key copy" rows. They may be encrypted by a user specified password or by a login password.

For key copies, the ekuid field contains the uid (user id) identifying the server user through sysusers.uid. For example, through aliasing, users Joe and Bob in db1 might map to server user Joe. If Joe's login password encrypts his key copy, Bob will not be able to access data encrypted by the named key.

For all rows, the ekvalue field contains a symmetric encryption of the key. To encrypt keys the database system currently derives a 128-bit key derived from either the system encryption password, the user specified password (from the create alter encryption key or alter encryption key command) or the login password, and uses this key to encrypt the raw key or a copy of the raw key.

For all rows, an ekpasswd field contains the random salt.

For all rows, the ekpublic and ekpairid fields will be null.

The ektype field identifies the key type. The possible values are EK_SYMMETRIC combined with EK_DEFAULT, EK_KEYCOPY and EK_RECOVERY.

The ekstatus field includes internal status information about the keys. EK_INITVECTOR indicates that a symmetric key uses initialization vector, while EK_RANDOMPAD indicates that a symmetric key uses random padding. A symmetric key encrypted for lost password protection is indicated by EK_KEYRECOVERY. EK_LOGINACCESS informs of a row containing encryption of key copy by the system encryption password, ready for re-encryption by the user's login password for login access and EK_LOGINPASS indicates a key copy already encrypted with a login password. EK_SYSENCRPASS indicates the keyvalue field contains a base key encrypted by the system encryption password and EK_USERPASS indicates that the keyvalue field of a base key or a key copy is encrypted by a user specified password.

A sysdepends system table contains one row for each key that is referenced by a column.

Bulk Copy

By default, BCP copies decrypted data in and out, and the database system automatically encrypts and decrypts the data. Users of BCP must have permission to decrypt data. There is also an option for BCP to copy the ciphertext. This option allows BCP to be run by administrators who lack decrypt permission on the data or knowledge of the password.

BCP indicates to the database system that the incoming data is already in encrypted form by using a session level set statement.

1: set ciphertext on

Database Loads and Dumps

Database dump and load operations work on the ciphertext of encrypted columns. This behavior preserves the policy of ensuring that the data for encrypted columns remains encrypted while on disk. Keys created at the database level are dumped and loaded along with the data they pertain to, maintaining the integrity of the data after it has been loaded. However, if a column is encrypted by a key in another database (the result of a cross-database select into, for example), the administrator should dump the source database (for the key) where the key was created at the same time as dumping the database containing the encrypted data. Otherwise, the integrity of the dumped data is at risk in case of changes to the key in another database.

After load, users must have knowledge of the same passwords that were used when the dumped data was encrypted. If the data in the dumped database was encrypted using the system default password, then the System Security Officer should ensure that the current system default password is the same as the one in use at the time of the dump. If the password has changed between the time the data was dumped and loaded, the encrypted data will be unusable.

Detailed Internal Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Create Encryption Key

Figure 4A:
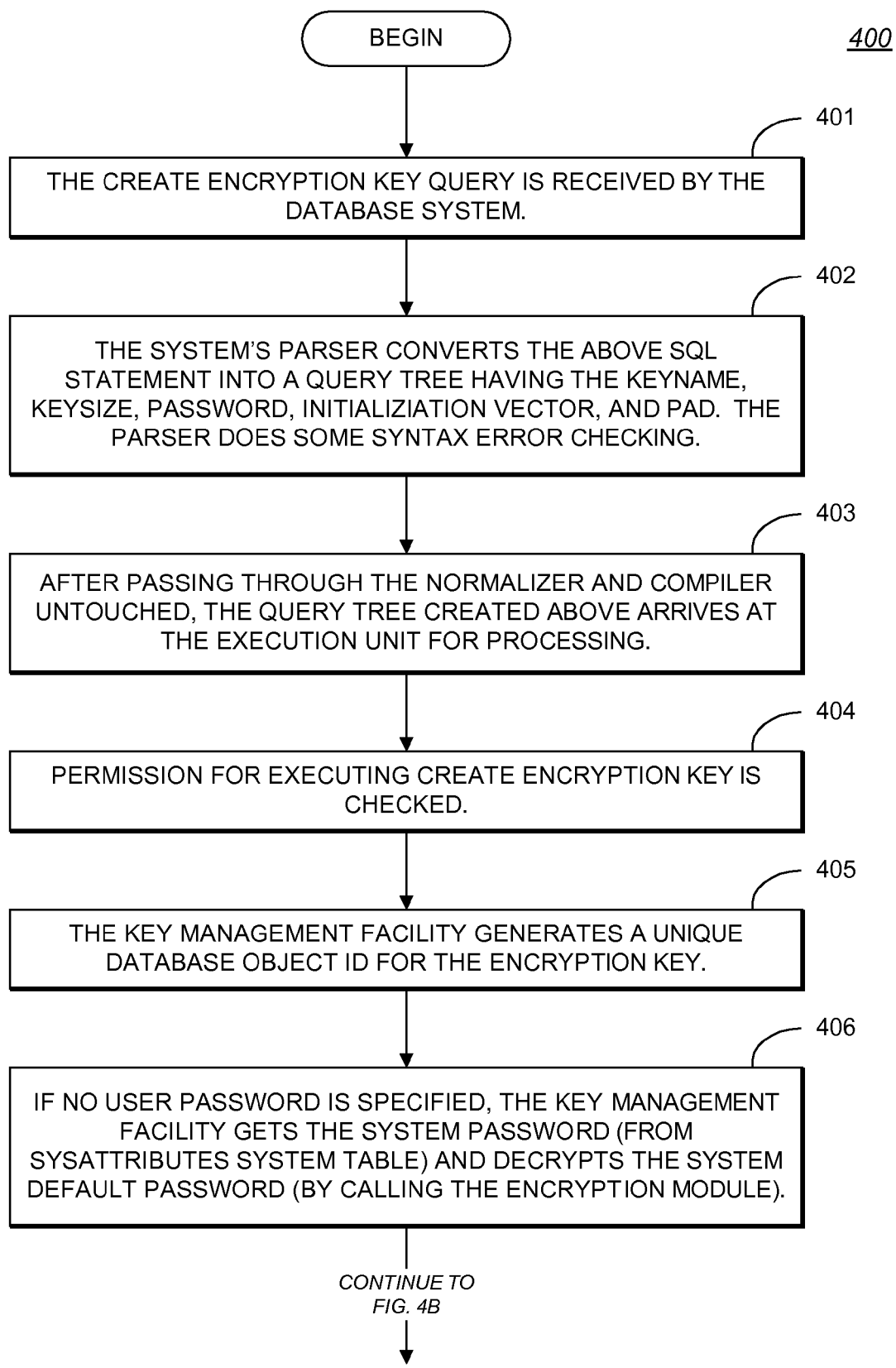
FIGS. 4A-B comprise a high-level flowchart illustrating the method steps of the present invention for creating an encryption key.
Figure 4B:
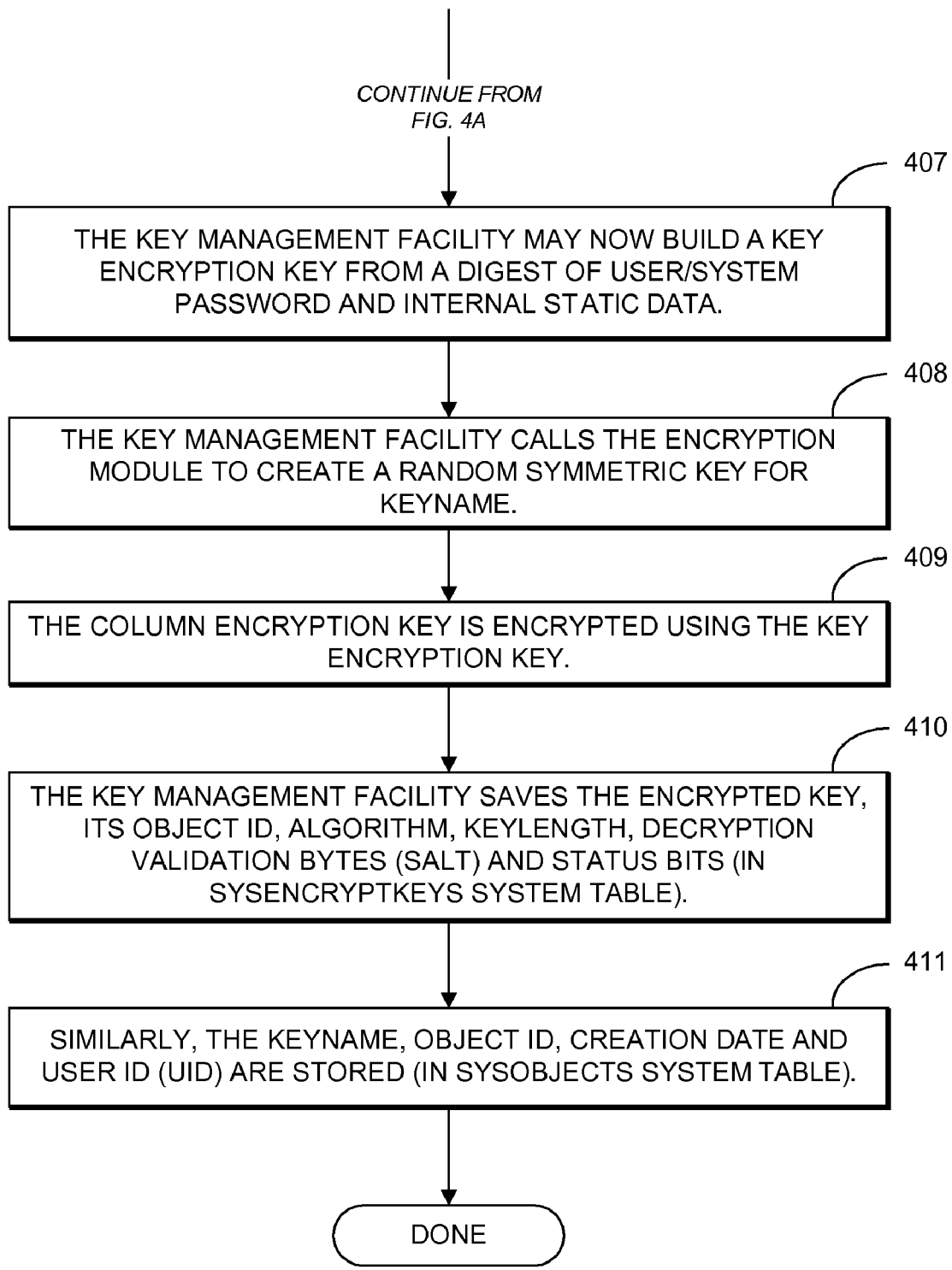

FIGS. 4A-B comprise a single high-level flowchart illustrating the method steps 400 of the present invention for creating an encryption key. Consider a query in the form:

```
1: create encryption key [[db.][owner.]] keyname [as default]
2: for algorithm
3: [with [keylength keysize]
4:   [passwd passphrase | system_encr_passwd]
5:   [init_vector [random | null]]
6:   [pad [random | null]]]
```

Upon the above create encryption key query being received by the database system (step 401), the system's parser converts the above SQL statement into a query tree having the keyname, keysize, password, initialization vector, and pad, as shown at step 402. The parser does some syntax error checking. After passing through the normalizer and compiler untouched, the query tree created above arrives at the execution unit for processing, as indicated by step 403.

The execution unit next invokes the system's key management facility to perform the following steps. First, at step 404, permission for executing create encryption key is checked. At step 405, the key management facility generates a unique database object ID for the encryption key. If no user password is specified, the key management facility gets the system password (from sysattributes system table) and decrypts the system default password (by calling the encryption module), at step 406. The key management facility may now build a key encryption key from a digest of user/system password and internal static data, indicated by step 407.

At step 408, the key management facility calls the encryption module to create a random symmetric key for keyname. At step 409, the column encryption key is encrypted using the key encryption key. Then, at step 410, the key management facility saves the encrypted key, its object ID, algorithm, keylength, decryption validation bytes (salt), and status bits (in sysencryptkeys system table). Similarly, the keyname, object ID, creation date and user ID (uid) are stored (in sysobjects system table), as indicated by step 411.

Create Table

Figure 5:
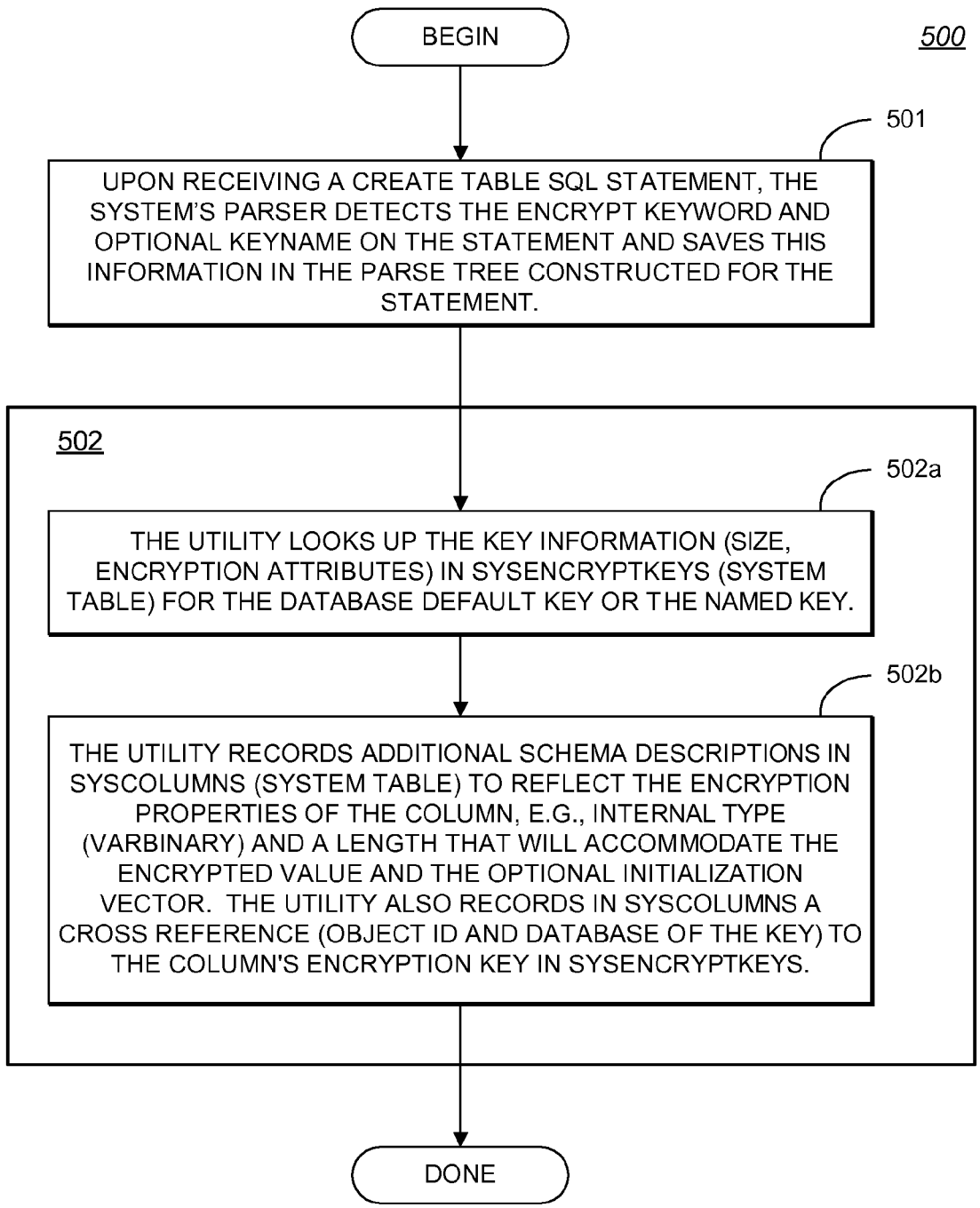
FIG. 5 is a high-level flowchart illustrating the method steps of the present invention that pertain to creating a table having encrypted column data.

FIG. 5 is a high-level flowchart illustrating the method steps 500 of the present invention that pertain to creating a table having encrypted column data. It should be noted that FIG. 5 describes the creating of a table having encrypted column data prior to the addition of the decrypt default functionality of the present invention described below in this document. The steps are as follows. Upon receiving a CREATE TABLE SQL statement, at step 501, the system's parser detects the ENCRYPT keyword and optional keyname on the statement and saves this information in the parse tree constructed for the statement. At step 502, an internal create table utility traverses the parse tree and performs the following substeps for each encrypted column. At step 502a, the utility looks up the key information (size, encryption attributes) in sysencryptkeys (system table) for the database default key or the named key. Now, at step 502b, the utility records additional schema descriptions in syscolumns (system table) to reflect the encryption properties of the column, e.g., internal type (VARBINARY) and a length that will accommodate the encrypted value and the optional initialization vector. The utility also records in syscolumns a cross reference (object ID and database of the key) to the column's encryption key in sysencryptkeys. Thereafter, the method is done.

Administration Utility for Managing the System Encryption Password

A new stored procedure sp_encryption calls an internal built-in function—ENCR_ADMIN—that implements the setting and resetting of the system password. The ENCR_ADMIN internal built-in function symmetrically encrypts the system encryption password supplied to sp_encryption using a key internally generated from a digest of three separate sources of static data within the database system. The encrypted password is saved in sysattributes.

The system encryption password is used in processing other statements as follows. During create table operations, it is decrypted and used as part of a digest to create a key encryption key for ENCRYPTing the newly created key (i.e., create encryption key operation). During DML (Data Manipulation Language) operations, the same thing is done to DECRYPT the encryption key. When the system encryption password is reset, all keys are decrypted using the old password and re-encrypted using the new password.

Simple Insert

Figure 6A:
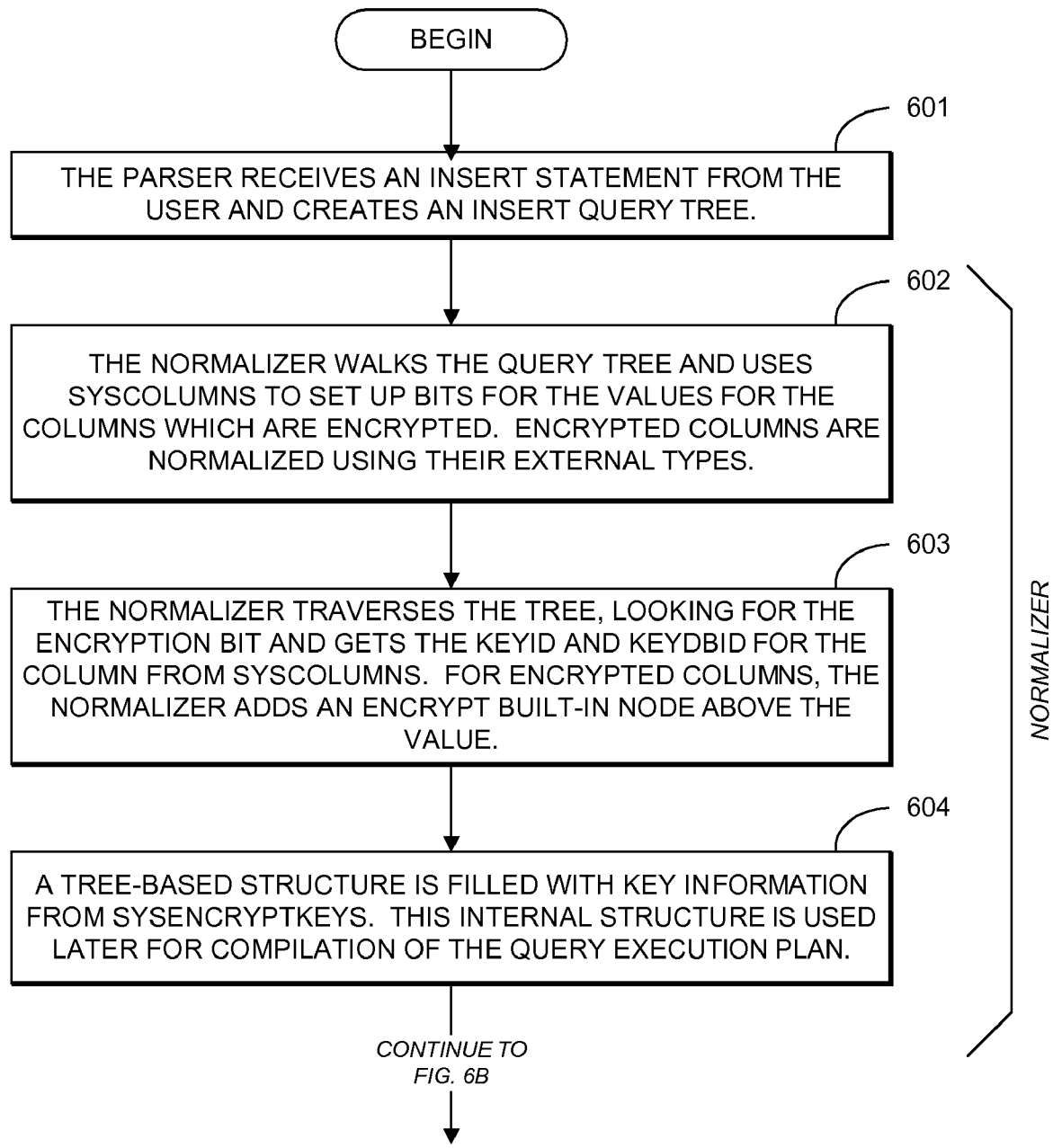
FIGS. 6A-C are high-level flowcharts illustrating the method steps of the present invention that pertain to processing a simple INSERT statement.
Figure 6B:
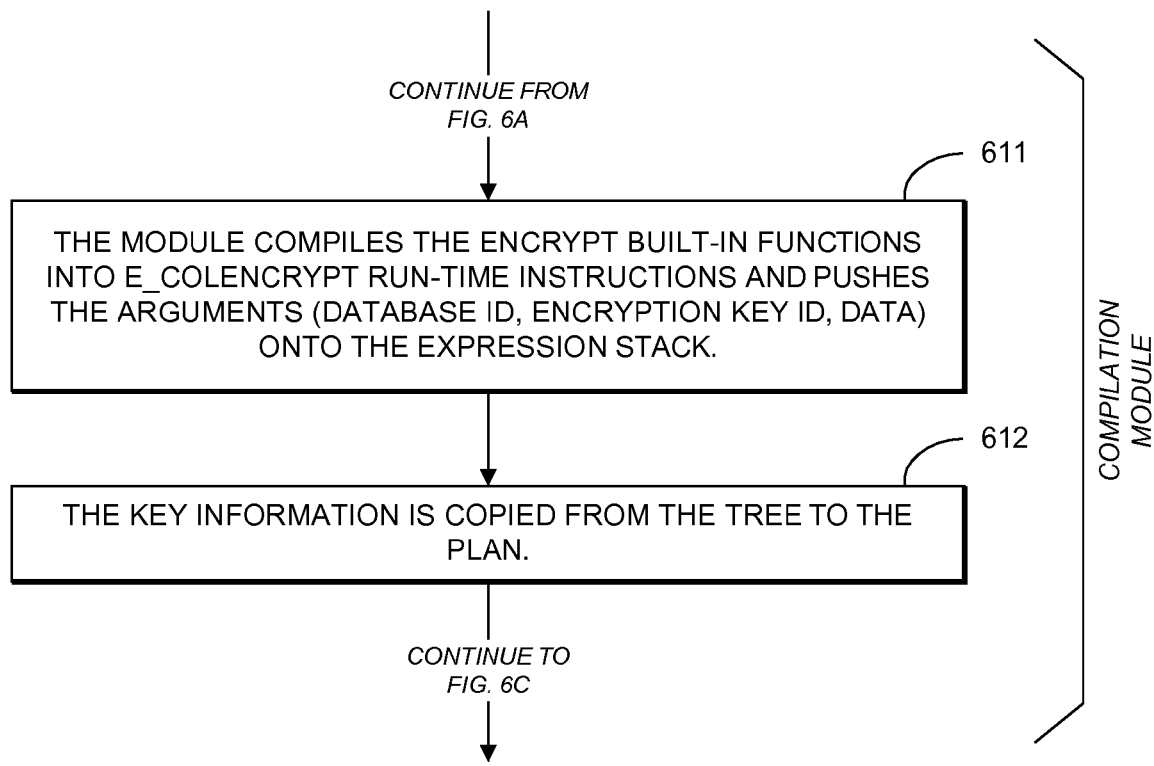
Figure 6C:
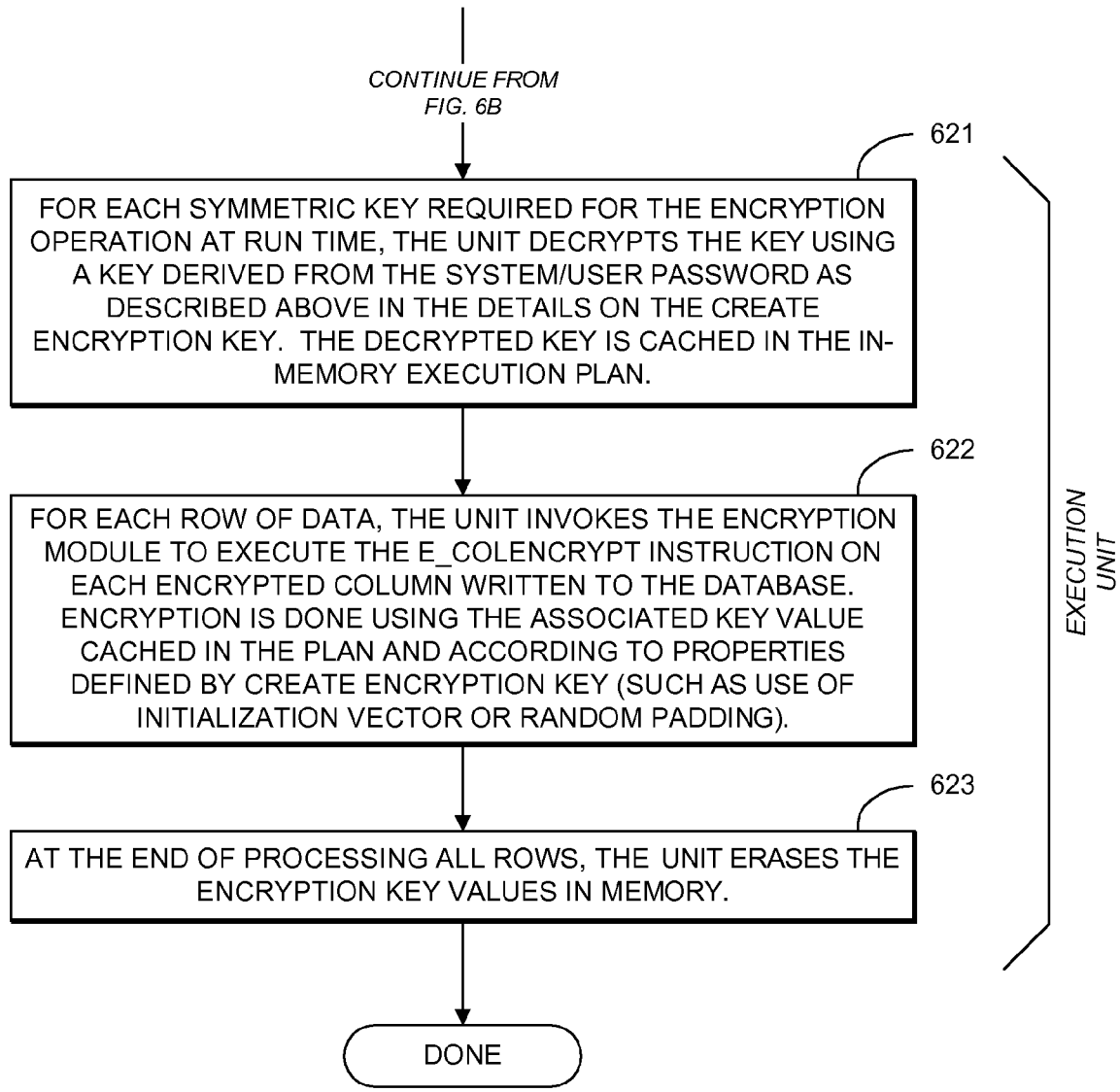

FIGS. 6A-C are high-level flowcharts illustrating the method steps of the present invention that pertain to inserting data in a table having encrypted columns. At the outset, the insert query tree created by the parser is given to the normalizer. As illustrated by FIG. 6A, the normalizer proceeds as follows. At step 601, the parser receives an INSERT statement from the user and creates an INSERT query tree. At step 602, the normalizer walks the query tree and uses syscolumns to set up bits for the values for the columns which are encrypted. Encrypted columns are normalized using their external types. At step 603, the normalizer traverses the tree, looking for the encryption bit and gets the keyid and keydbid for the column from syscolumns. For encrypted columns, the normalizer adds an encrypt built-in node above the value. Now, at step 604, a tree-based structure is filled with key information from sysencryptkeys. This internal structure is used later for compilation of the query execution plan.

As illustrated by FIG. 6B, the compilation/code generation module operates as follows. At step 611, the module compiles the encrypt built-in functions into E_COLENCRYPT runtime instructions and pushes the arguments (database id, encryption key id, data) onto the expression stack. At step 612, it copies the key information from the tree to the plan.

As illustrated by FIG. 6C, the execution unit operates as follows. For each symmetric key required for the encryption operation at run time, the unit decrypts the key using a key derived from the system/user password as described above in the details on the create encryption key, as indicated at step 621. The decrypted key is cached in the in-memory execution plan. For each row of data, the unit invokes the encryption module to execute the E_COLENCRYPT instruction on each encrypted column written to the database, as indicated at step 622. Encryption is done using the associated key value cached in the plan and according to properties defined by create encryption key (such as use of initialization vector or random padding). At the end of processing all rows, the unit erases the encryption key values in memory, as shown at step 623.

Simple SELECT, and simple SELECT with WHERE clause

Figure 7A:
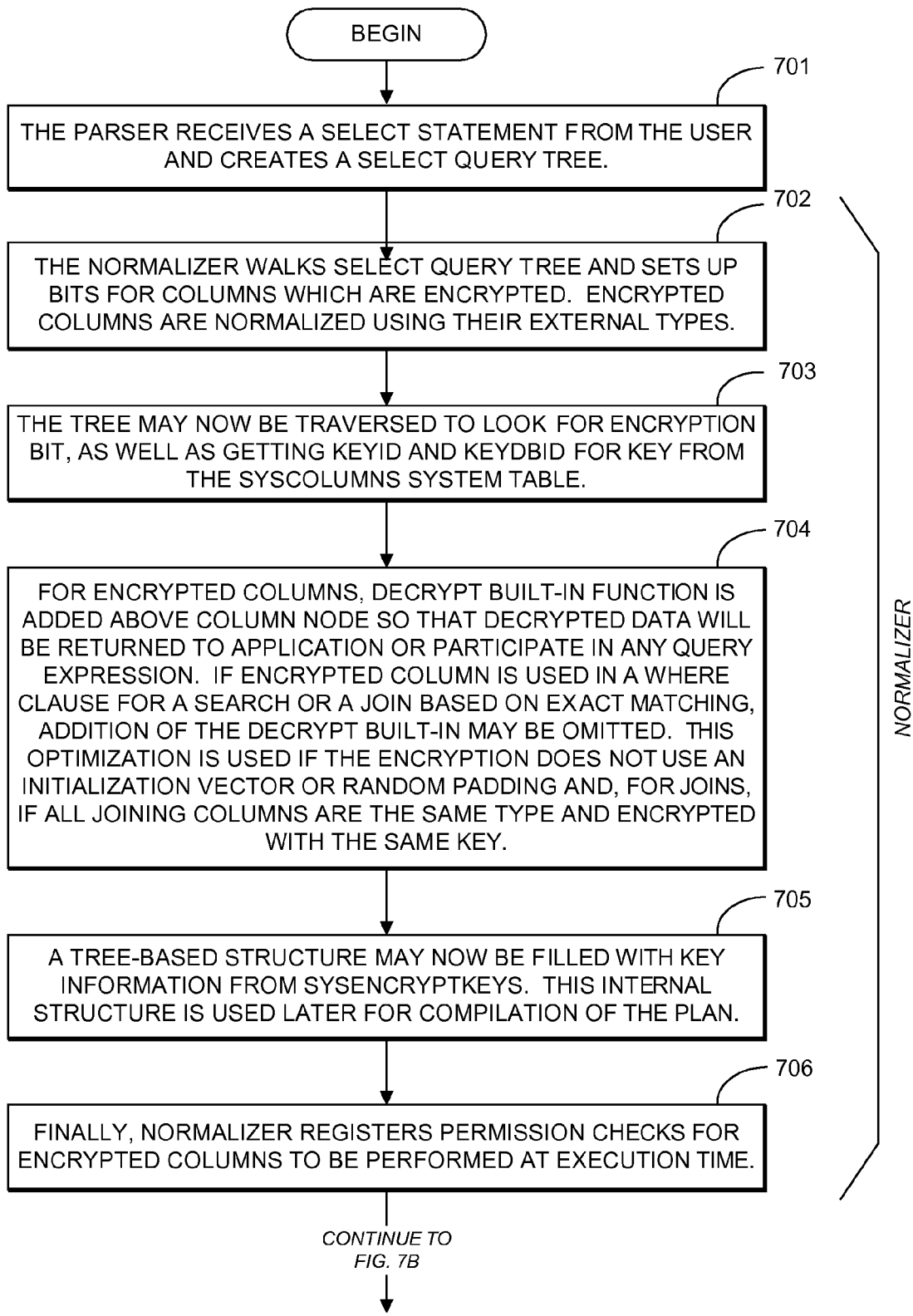
FIGS. 7A-C are high-level flowcharts illustrating the method steps of the present invention that pertain to processing a simple SELECT statement, and a simple SELECT with WHERE clause.
Figure 7B:
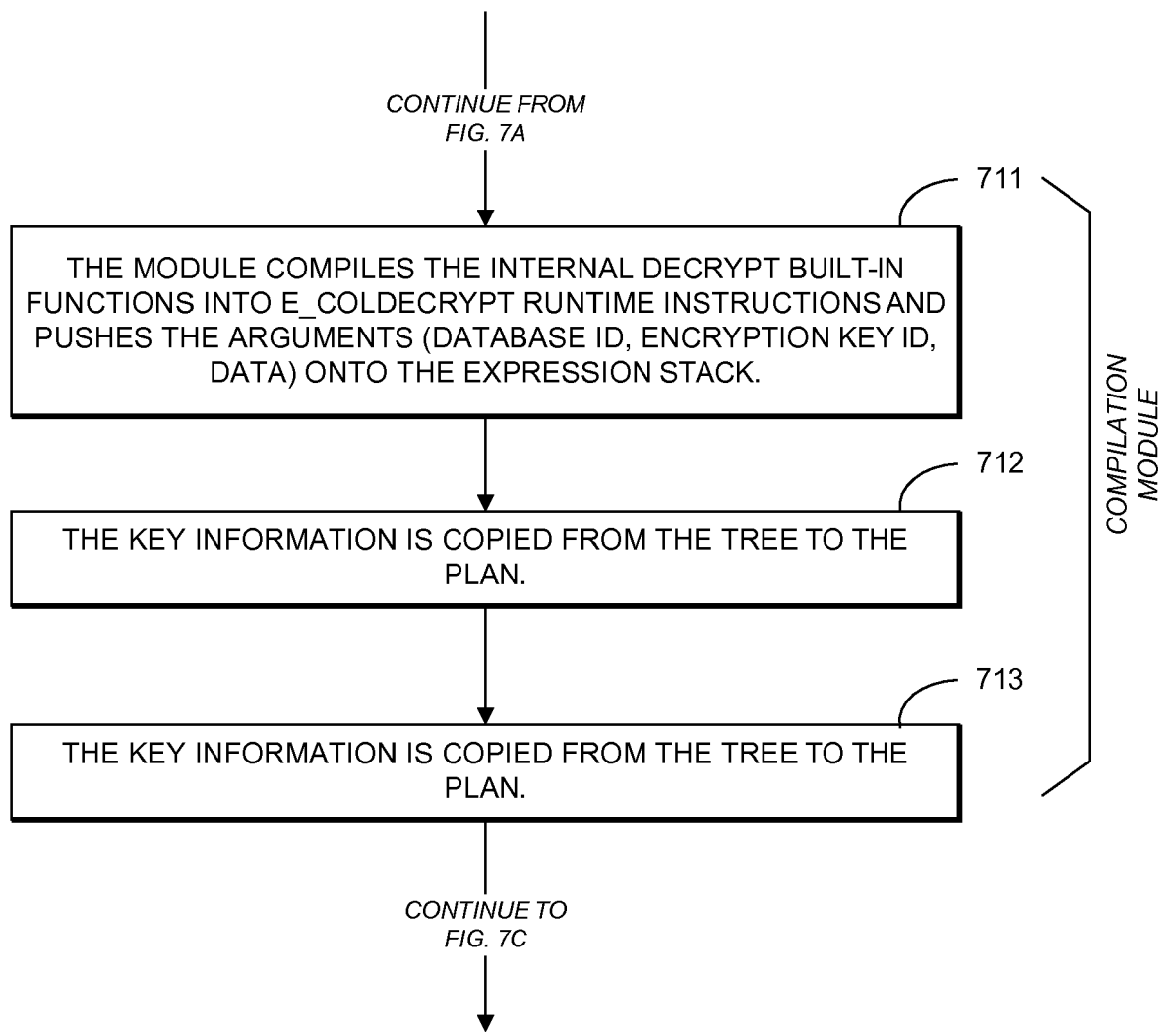
Figure 7C:
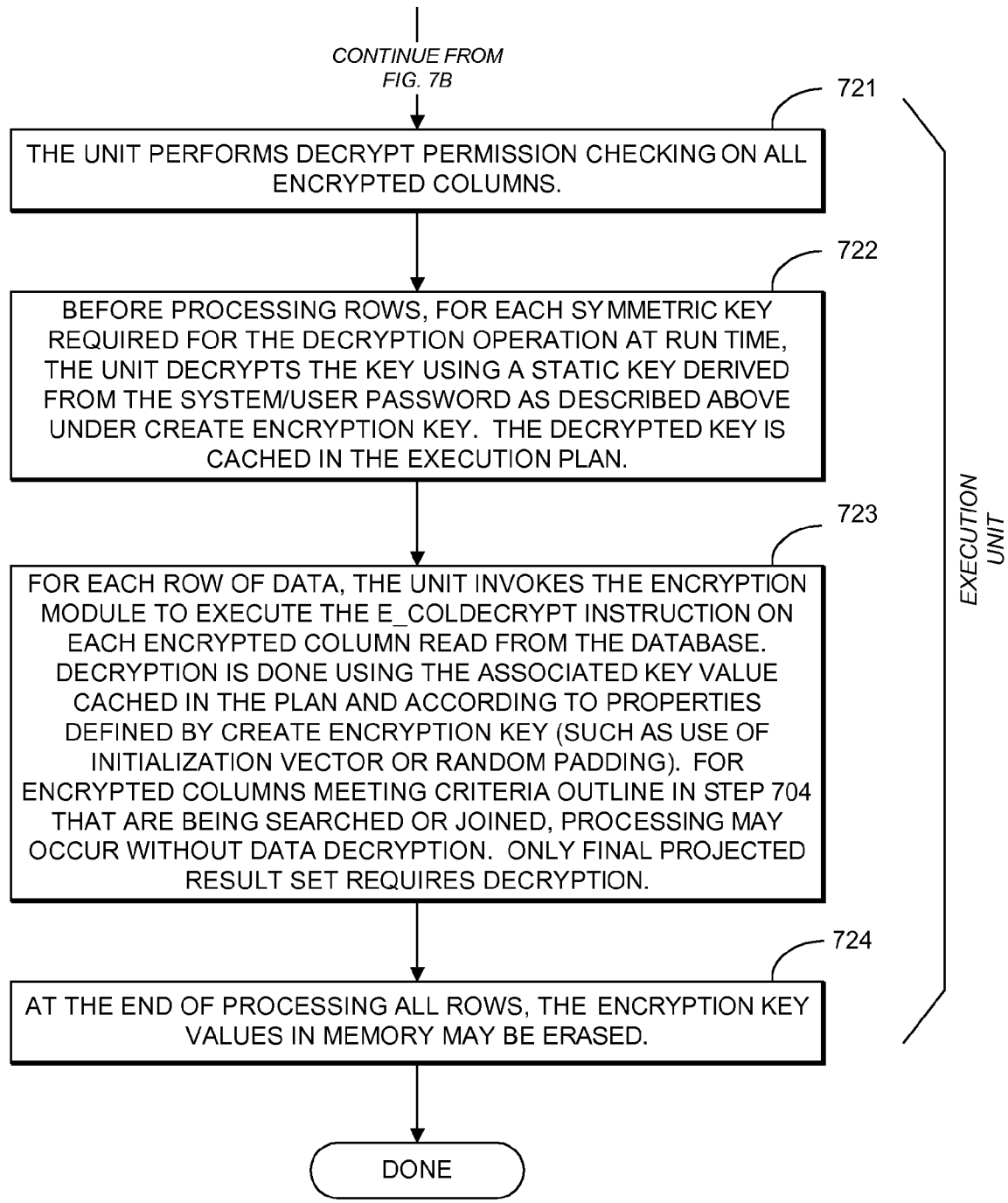

FIGS. 7A-C are high-level flowcharts illustrating the method steps of the present invention that pertain to processing a simple SELECT statement, and a simple SELECT with WHERE clause. It should be noted that FIGS. 7A-C describes the operations for processing SELECT statements prior to the addition of the decrypt default functionality of the present invention described below in this document. As illustrated by FIG. 7A, the SELECT query is processed as follows. At step 701, the parser receives a SELECT statement from the user and creates a select query tree. At step 702, the normalizer walks the select query tree and sets up bits for the columns which are encrypted. Encrypted columns are normalized using their external types. At step 703, the tree may now be traversed to look for the encryption bit, as well as getting the keyid and keydbid for the key from the syscolumns system table. For encrypted columns, the decrypt built-in function is added above the column node so that decrypted data will be returned to the application or participate in any query expression, as indicated at step 704. The present invention also includes an optimization which provides if the encrypted column is used in a WHERE clause for a search or a join based on exact matching, addition of the decrypt built-in may be omitted at step 704. This optimization is used if the encryption does not use an initialization vector or random padding and, for joins, if all joining columns are the same type and encrypted with the same key.

A tree-based structure may now be filled with key information from sysencryptkeys, as shown at step 705. This internal structure is used later for compilation of the plan. Finally, at step 706, the normalizer registers permission checks for encrypted columns to be performed at execution time.

As illustrated by FIG. 7B, the compilation/code generation module operates as follows. The module compiles the internal decrypt built-in functions into E_COLDECRYPT runtime instructions and pushes the arguments (database id, encryption key id, data) onto the expression stack, at step 711. The key information is copied from the tree to the plan, at step 712. The permission check request structures are copied into the plan for runtime permission evaluation, at step 713.

As illustrated by FIG. 7C, the execution unit operates as follows. The unit performs decrypt permission checking on all encrypted columns, at step 721. Before processing rows, for each symmetric key required for the decryption operation at run time, the unit decrypts the key using a static key derived from the system/user password as described above under create encryption key, as shown by step 722. The decrypted key is cached in the execution plan. For each row of data, at step 723, the unit invokes the encryption module to execute the E_COLDECRYPT instruction on each encrypted column read from the database. Decryption is done using the associated key value cached in the plan and according to properties defined by create encryption key (such as use of initialization vector or random padding). For encrypted columns meeting the criteria outlined at step 704 that are being searched or joined, the processing may occur without data decryption. Only the final projected result set requires decryption. At the end of processing all rows, the encryption key values in memory may be erased, as indicated at step 724.

Decrypt Default Attribute and Functionality for Encrypted Columns

Introduction

The present invention provides decrypt default (decrypt_default) functionality for encrypted columns. A decrypt_default is an attribute of an encrypted column that provides a constant expression to be returned to a user who selects that column without the required decrypt permission. Businesses and organizations that use the encrypted columns feature can make use of the decrypt default functionality of the present invention to mask sensitive data from non-privileged users without application changes. While protecting sensitive data, the present invention also enables existing applications to operate even when such applications request or search on protected data in an encrypted column. For encrypted columns in a select list, a user without decrypt permission is returned a default value; for encrypted columns used to search or join data in a where clause, the search or join silently fails to qualify rows for a user without decrypt permission.

When selecting data from an encrypted column a user must have SELECT and DECRYPT permissions on the column or table to see the decrypted data. Organizations generally restrict access to private encrypted data by granting decrypt permission to only those users with a need to know. At the same time, these organizations may assign non-privileged users with the task of running legacy-reporting applications that may select all data from a given table, including data in encrypted columns. By returning a decrypt default value instead of the actual data from an encrypted column, legacy applications can run to completion without error and without revealing sensitive information. The decrypt default value is specified on the CREATE/ALTER table statements as a column attribute. For example, a table may be created or altered to encrypt a credit card number and may specify a decrypt default value of '****************'. The effect of this is that Sybase® Adaptive Server® Enterprise (database server commercial embodiment) will return the string of asterisks instead of a valid credit card number when a user who lacks decrypt permission selects from the credit card column. Because Adaptive Server Enterprise (ASE) withholds a permissions error (10330) and instead returns a default value, the application continues to run and to fulfill other reporting functions. This is particularly useful for legacy applications, which continue to run without change against an encrypted schema.

Prior to introduction of the decrypt default functionality, ASE returned error message 10330 "Decrypt permission denied on object<table name>database<database name>owner<owner name>" when a user without decrypt permission selects from an encrypted column or uses an encrypted column in a where clause. No data of any kind was returned for a query against an encrypted column. This is problematic for users that have legacy software applications that their businesses depend upon, but for which they have no resources to enhance and rebuild. For example, an application may have been coded to return all customer information, including personally identifiable information (PII). Recent legislation requiring businesses to safeguard the privacy of PII may require a report that previously printed out a user's social security number or credit card number to now conceal that information. The decrypt default functionality allows the business—without change to its applications—to print a meaningless default value instead of revealing PII. For instance if the customer table contains the encrypted column creditcard, users can design the schema such that a select * from customer returns a predefined decrypt_default value for the creditcard column to users who lack decrypt permission. The query or report runs to completion returning the default value instead of generating private data from the creditcard column or a permissions error.

A decrypt default fulfills a similar purpose on a select statement that a regular default does on an insert or update statement. Whereas a regular default value is used by ASE when the associated column is not specified in an insert or update target list, a decrypt default associated with a column is supplied by ASE when a user lacks decrypt permission on that column.

Syntax

The present invention provides new syntax on the CREATE and ALTER TABLE statements to add and drop a decrypt default. The decrypt default is identified with an internally generated name and is represented in the system catalogs in a similar way as regular DEFAULTs and RULES or CHECK CONSTRAINTS are represented.

The CREATE TABLE statement has new syntax to specify the decrypt default (DECRYPT_DEFAULT) value to return for an encrypted column as follows:

```
1: CREATE TABLE <tabname> (<colname> <datatype> ...
2:    [ENCRYPT [WITH <keyname>] [DECRYPT_DEFAULT
       <constant_expr>]]
3:    [,<colname> ....])
```

A decrypt default can also be specified on an added column using the following ALTER TABLE syntax:

```
1: ALTER TABLE <tabname>
2:    ADD <colname> <datatype> ...
3:    [ENCRYPT [WITH <keyname>] [DECRYPT_DEFAULT
       <constant_expr>]]
4:    [,<colname> ....])
```

When modifying a column to encrypt it, a decrypt default can be specified as follows:

```
1: ALTER TABLE <tabname>
2:    MODIIFY <colname> <optional datatype, etc>
3:    [ENCRYPT [WITH <keyname>] [DECRYPT_DEFAULT
       <constant_expr>]]
4:    [,<colname> ....])
```

In order to add decrypt default to an existing encrypted column, or change the decrypt default value on a column for which a decrypt default has previously been specified, the following ALTER TABLE syntax can be utilized:

```
1: ALTER TABLE <tabname>
2:    REPLACE <colname> DECRYPT_DEFAULT <constant_expr>
```

To remove decrypt default from a column that remains encrypted the following ALTER TABLE syntax is used:

```
1: ALTER TABLE <tabname>
2:    REPLACE <colname> DROP DECRYPT_DEFAULT
```

Permission Checking

Permission checking in the database server (ASE) is controlled by a set of permission checking data structures (PCRs) that encapsulate the permission checking to allow access to data. These structures lead to invocation of related C-code to perform the checks when a query plan is executed. The PCRs are built during the normalization phase of query processing. For encrypted columns with the decrypt default attribute, the decrypt PCRs are omitted and replaced by checks and conditional logic in the plan itself. Therefore instead of decrypt permission being just one of many permission checks performed just prior to execution of a plan, the decrypt permission is performed as an instruction in the plan at the point that the encrypted column is selected or searched.

The query plan is built from a query tree. Before compilation the database server passes the tree through "pre-processing" that makes modifications for aggregate processing and view resolution. During this phase the database server modifies the query tree to force an ad hoc check for decrypt permission on any decrypt default column in the query's target list. The check is made through an internal built-in function decrypt_perm( ). In effect, a query such as "select decrypt_def_col from t" is transformed to

```
1:  select case when decrypt_perm(decrypt_def-col) = 1
2:     then decrypt_def_col
3:     else constant /* decrypt_default value */
4:  end
```

The effect of this transformation is to always perform a decrypt permission check in order to decide at runtime whether to return the decrypt default value or the decrypted content of the column. In other words, if an encrypted column in the target list of a select statement has a declared decrypt_default and the user has not been granted decrypt permission either implicitly or explicitly, then the user does not get a permissions error based on lack of decrypt permission. Instead he or she is returned the decrypt_default value for that column. Users who have decrypt permission on the column get the data from the column.

The same transformation is used when a column with a decrypt default is used as a grouping column. In this case the data is grouped by a constant value if the user does not have decrypt permission, which amounts to no grouping at all.

Columns with decrypt_default attribute in the target list of a select statement may themselves be part of expressions, such as the illustrated by the following example:

```
1: select intcol_with_deccrypt_def + 4 from tab
```

Target lists of insert and update statements are not affected by the decrypt_default attribute.

When an encrypted column with a decrypt default attribute is referenced in a where clause, the transformation includes adding a qualification "and decrypt_perm( )=1" to be evaluated in addition to any qualification of the form "where decrypt_def_col <relational op> <column or value>". This has the effect of failing any qualification that references the encrypted column. For example, the following expression:

```
1: select col1 from t where intcol_with_decrypt_def = 4
``` would be executed as if the user had typed:

```
1: select col1 from t where decrypt_perm(intcol_with_decrypt_def)
2:   and intcol_with_decrypt_def = 4
```

It should be noted that the order of the predicates is important. If the user does not have decrypt permission then ASE currently will not even process the search. So the user lacking decrypt permission would get 0 rows (but no error).

Any qualifications that are joined by the OR operator and which do not refer to the encrypted column are evaluated.

Consider, for example, the evaluation of the following expression including an OR predicate:

```
1: select col1 from t where intcol_with_decrypt_def = 4
2:    or other_col = 6
```

For a user lacking decrypt permission, this would be executed as:

```
1: select col1 from t where other_col = 6
```

As described above, the present invention provides a configurable column option to return default data if permission for access to the data has not been granted. The present invention enables use of encrypted column database functionality with existing applications without requiring changes to such existing applications. If data in an encrypted column is requested by a user lacking decrypt permission and/or knowledge of the key's password, specified default values are returned. This allows existing applications/reports to run to completion without generation of a permissions error while at the same time keeping private data secure against unauthorized users.

Create Table with Decrypt Default

Figure 8:
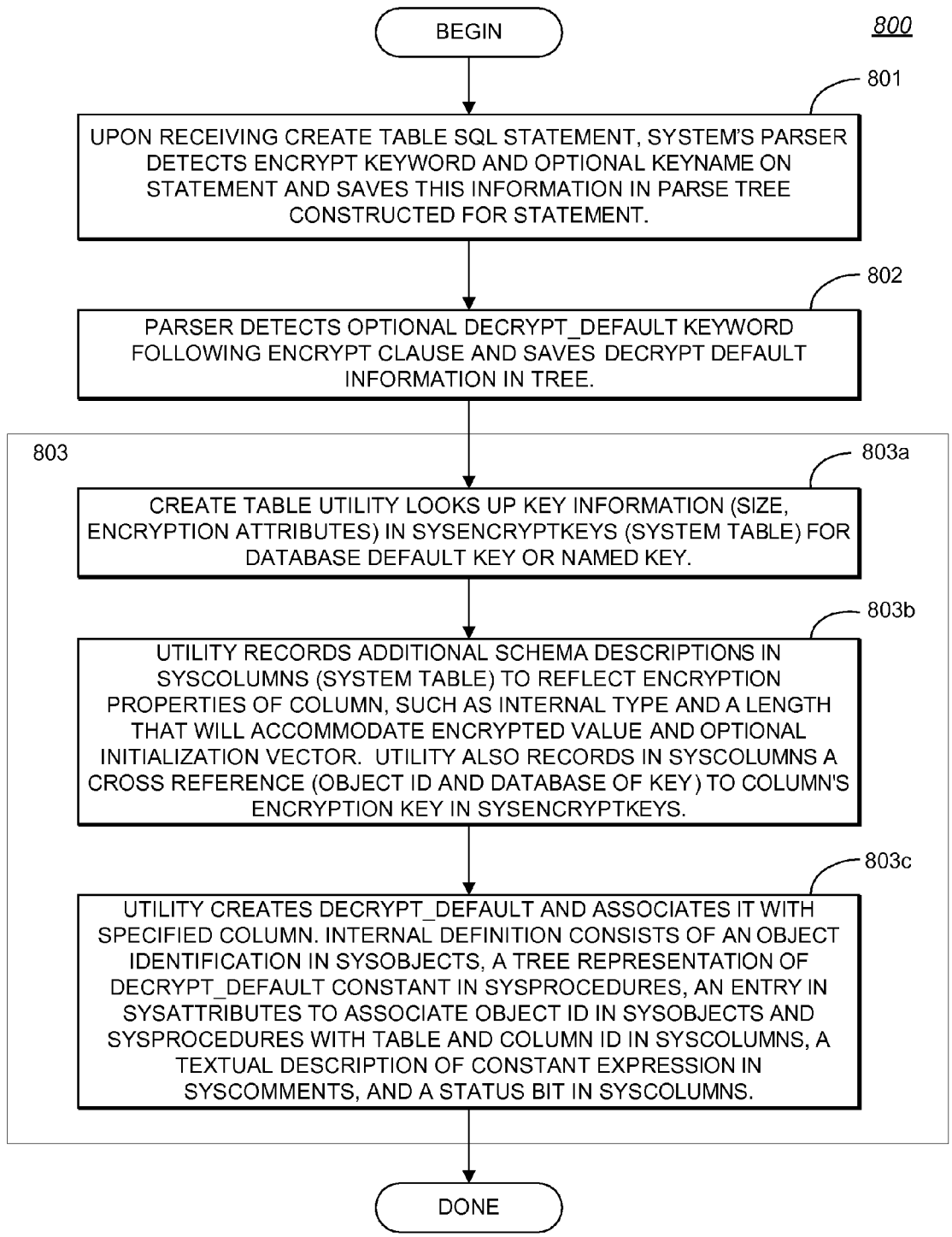
FIG. 8 is a high-level flowchart illustrating the method steps of the present invention that pertain to creating a table having encrypted column data with a decrypt default attribute.

FIG. 8 is a high-level flowchart illustrating the method steps 800 of the present invention that pertain to creating a table having encrypted column data with a decrypt default (decrypt_default) attribute. The steps are as follows. Upon receiving a CREATE TABLE SQL statement, at step 801, the system's parser detects the ENCRYPT keyword and optional keyname on the statement and saves this information in the parse tree constructed for the statement. At step 802, the parser detects the optional DECRYPT_DEFAULT key word following the ENCRYPT clause. It saves the decrypt_default information in the tree in much the same way as column check constraint information is saved.

At step 803, an internal create table utility traverses the parse tree and performs the following substeps for each encrypted column. At step 803a, the create table utility looks up the key information (size, encryption attributes) in sysencryptkeys (system table) for the database default key or the named key. At step 803b, the utility records additional schema descriptions in syscolumns (system table) to reflect the encryption properties of the column, e.g., internal type (VARBINARY) and a length that will accommodate the encrypted value and the optional initialization vector. The utility also records in syscolumns a cross reference (object ID and database of the key) to the column's encryption key in sysencryptkeys. Now, at step 803c, the utility creates a decrypt_default and associates it with the column for which it is specified. The decrypt_default internal definition consists of an object identification in sysobjects, using an internally generated object name and number, a tree representation of the decrypt_default constant in sysprocedures, an entry in sysattributes to associate the decrypt_default's object id in sysobjects and sysprocedures with the table and column id in syscolumns, a textual description of the decrypt_default constant expression in syscomments, and a status bit in syscolumns to indicate that the column has a decrypt_default. Thereafter, the method is done.

Processing of Simple SELECT, and Simple SELECT with WHERE Clause

Figure 9A:
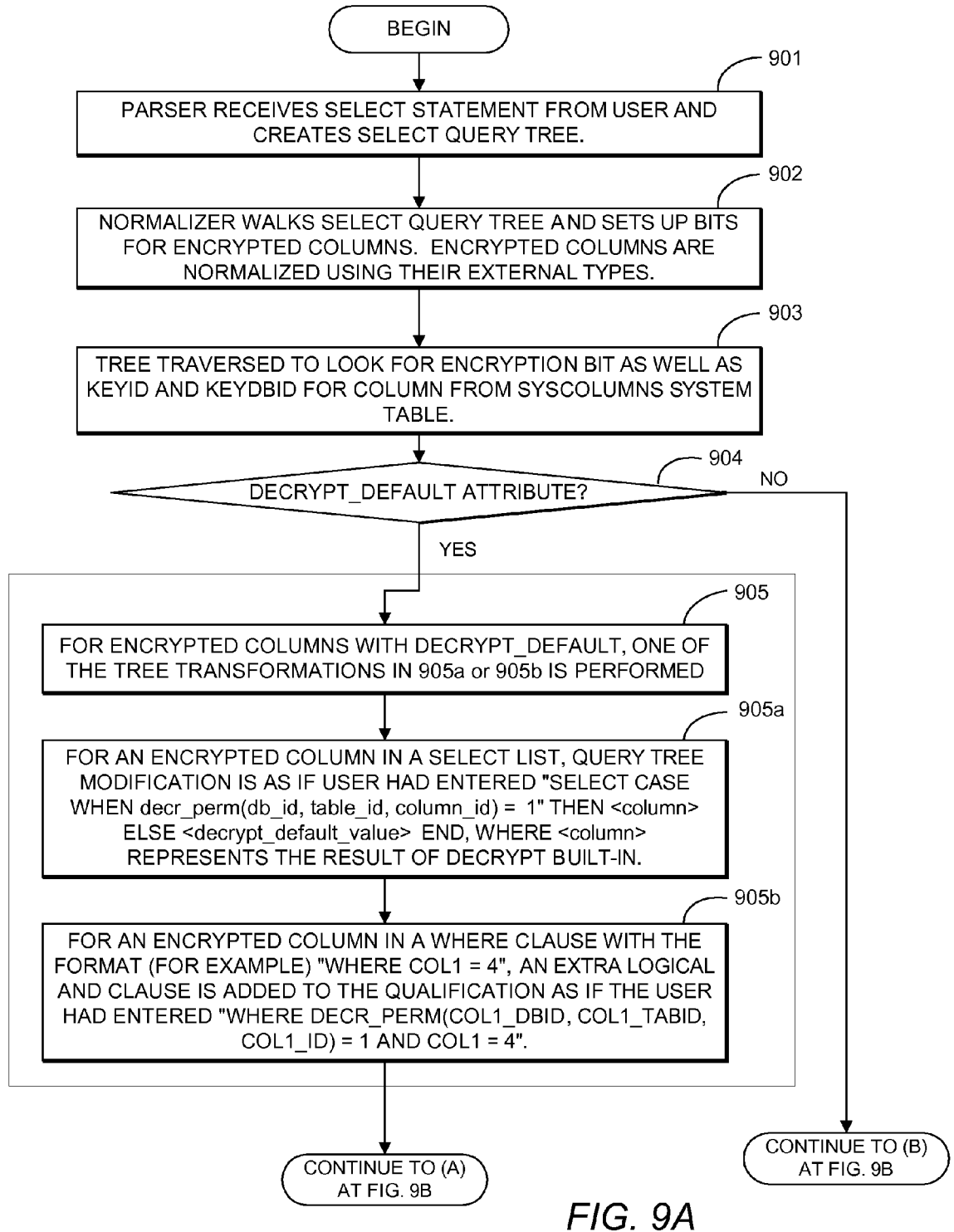
FIGS. 9A-D comprise a single high-level flowchart illustrating the method steps of the present invention that pertain to processing a simple SELECT statement, and a simple SELECT with WHERE clause with use of the decrypt default functionality of the present invention.
Figure 9B:
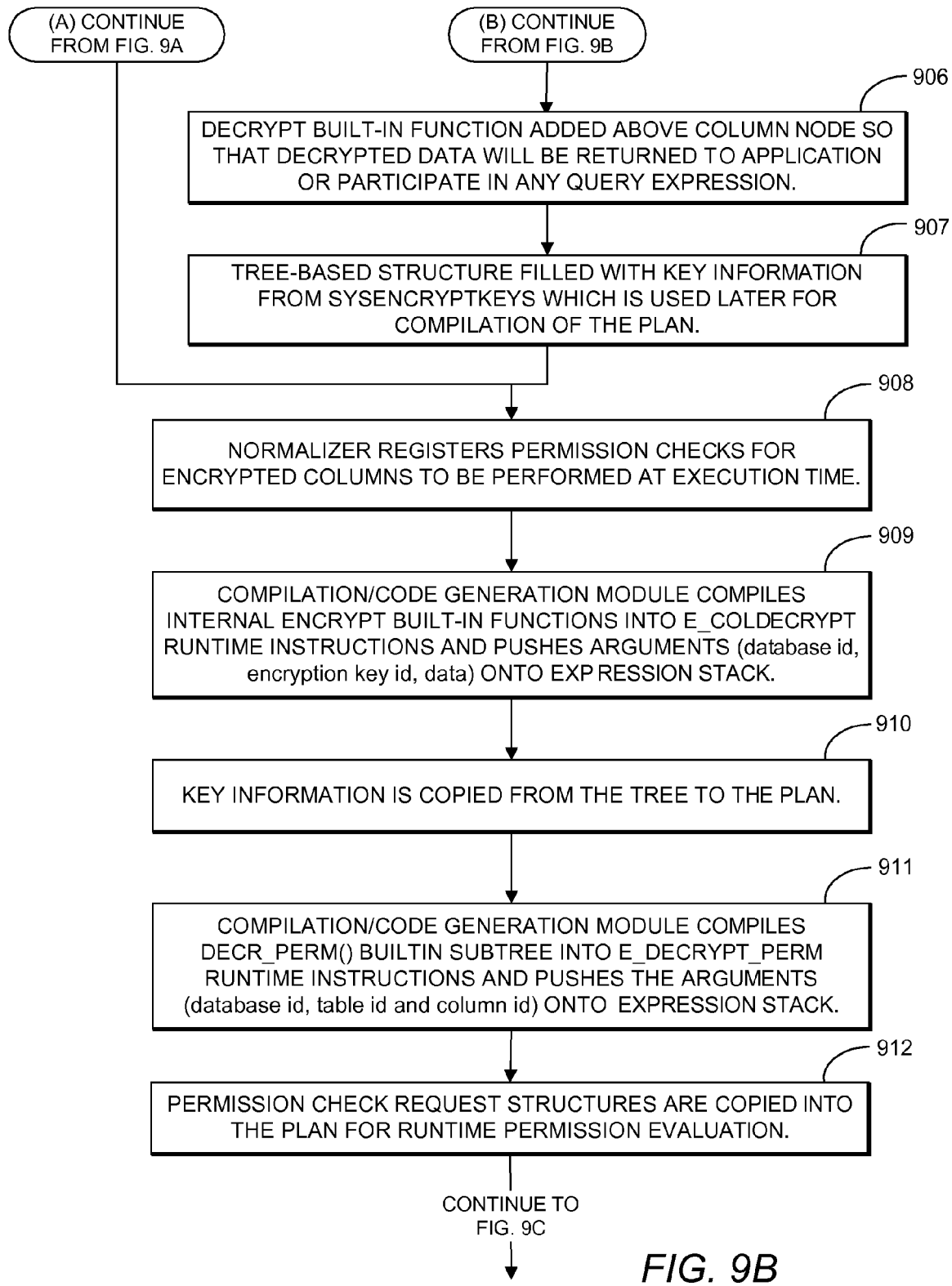
Figure 9C:
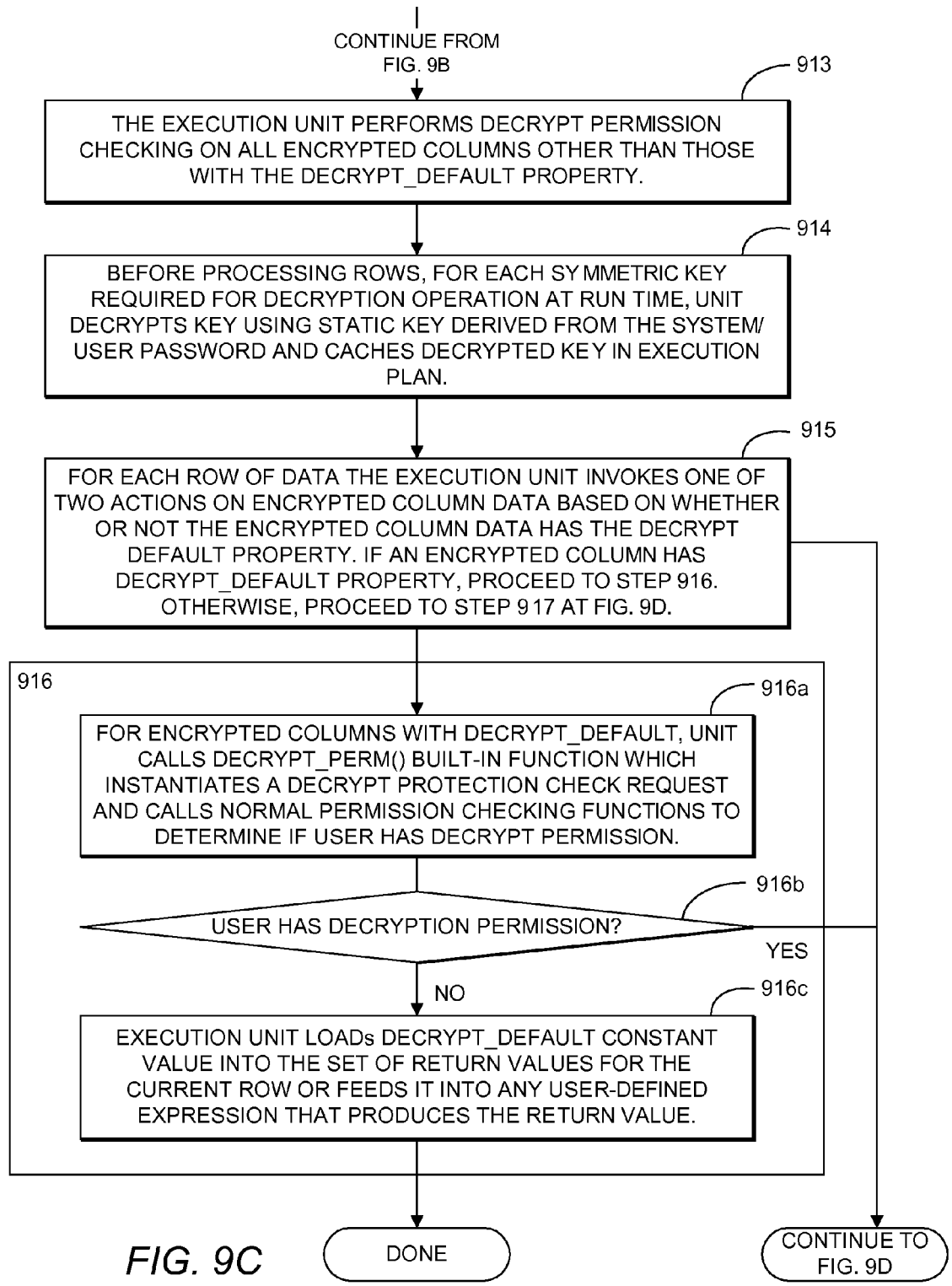
Figure 9D:
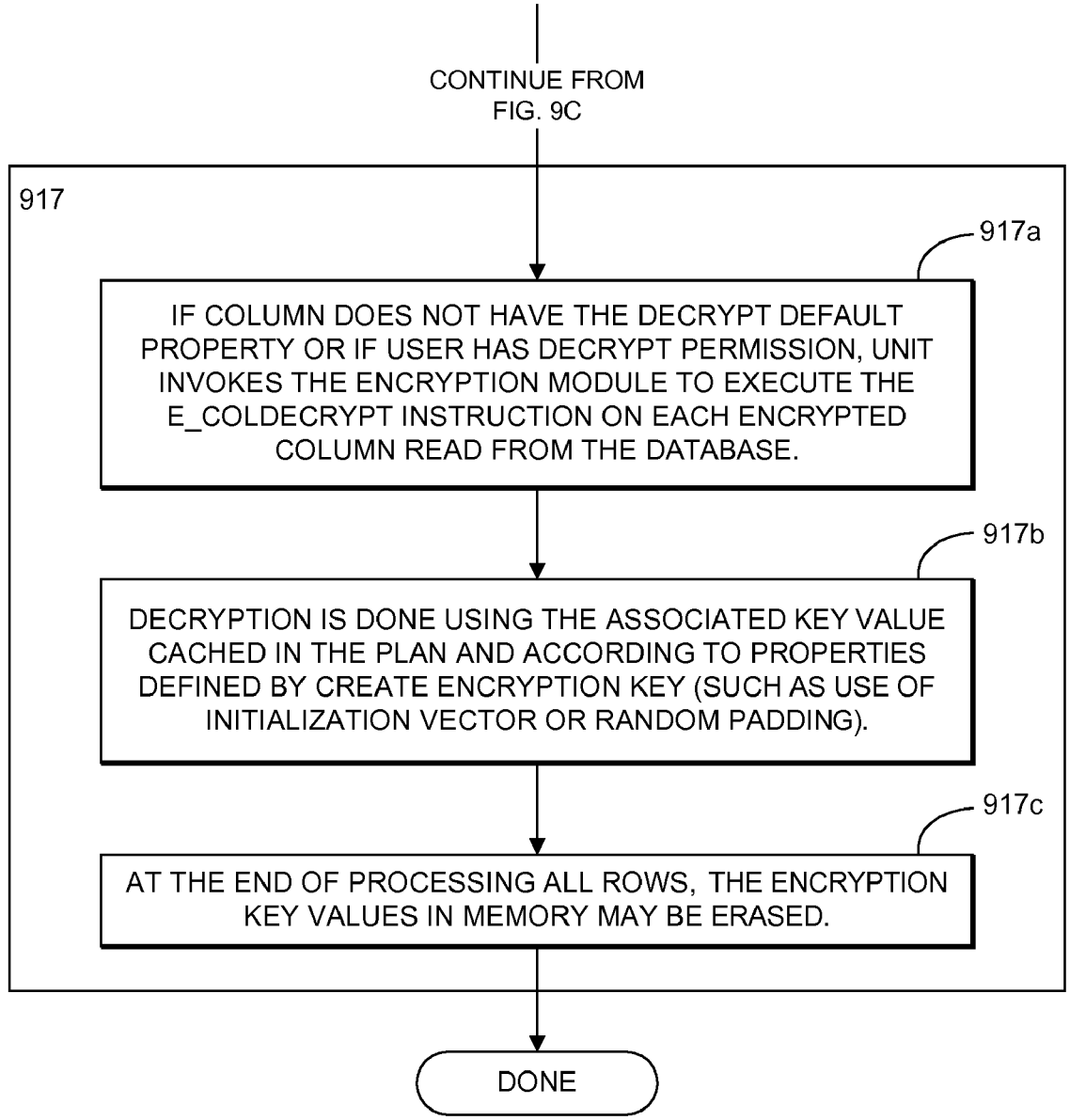

FIGS. 9A-D comprise a single high-level flowchart 900 illustrating the method steps of the present invention that pertain to processing a simple SELECT statement, and a simple SELECT with WHERE clause with use of the decrypt default functionality of the present invention. Although this example illustrates the processing of a SELECT statement, the present invention may also be used for processing UPDATE and DELETE statements. As illustrated by FIG. 9A, a query including a SELECT statement is processed as follows. At step 901, the parser receives a SELECT statement from the user and creates a select query tree. At step 902, the normalizer walks the select query tree and sets up bits for the columns which are encrypted. Encrypted columns are normalized using their external types. At step 903, the tree may now be traversed to look for the encryption bit, as well as getting the keyid and keydbid for the column from the syscolumns system table. At this point, the method branches based on whether or not the encrypted column has a decrypt_default attribute. As shown at decision step 904, if the encrypted column has a decrypt_default attribute the method proceeds to step 905. Otherwise, it proceeds to step 906 if does not have the attribute.

For encrypted columns with a decrypt_default one of the following tree transformations at steps 905a or 905b is performed at step 905. For an encrypted column in a SELECT-list, at step 905a the query tree is modified as if the user had entered "SELECT CASE WHEN decr_perm(db_id, table_id, column_id)=1" THEN<column>ELSE <decrypt_default_value>END, where <column> represents the result of the decrypt built-in. For an encrypted column in a WHERE clause with the format (for example) "WHERE col1=4", an extra logical AND clause is added to the qualification as if the user had entered "WHERE decr_perm (col1_dbid, col1_tabid, col1_id)=1 AND col1=4" at step 905b. Decr_perm( ) is an ASE built-in function which returns 1 if the session's user has decrypt permission on the column and 0 otherwise.

For encrypted columns with no decrypt_default attribute, the decrypt built-in function is added above the column node so that decrypted data will be returned to the application or participate in any query expression, as indicated at step 906. A tree-based structure may now be filled with key information from sysencryptkeys, as shown at step 907. This internal structure is used later for compilation of the plan. Next, at step 908, the normalizer registers permission checks for encrypted columns to be performed at execution time. It omits the DECRYPT permission check for column with the decrypt default property because that permission check will be compiled into the plan as a call to the decr_perm( ) built-in function.

At this point the compilation/code generation module is invoked and performs the following operations. At step 909, the compilation/code generation module compiles the internal encrypt built-in functions into E_COLDECRYPT runtime instructions and pushes the arguments (database id, encryption key id, data) onto the expression stack. The key information is copied from the tree to the plan, at step 910. At step 911, the module compiles the decr_perm( ) built-in subtree into E_DECRYPT_PERM runtime instructions and pushes the arguments (database id, table id and column id) onto the expression stack. Here, for an encrypted column in a select-list, the case statement in the select list described above at step 907a is compiled into branching logic which tests the return value of the decr_perm( ) built-in function and jumps either to an instruction to decrypt the column value or to one which simply loads the decrypt_default constant into the result column or column expression. The extra WHERE clause qualification for decrypt default columns described above at step 907b translates into an E_DECRYPT_PERM instruction which is pre-evaluated once to a constant for testing and branching to the runtime instructions to evaluate the query predicate or to an instruction which automatically evaluates the predicate as false. At step 912, the permission check request structures are copied into the plan for runtime permission evaluation.

After the above steps, the execution unit performs the following operations. The execution unit performs decrypt permission checking on all encrypted columns other than those with the decrypt default property, at step 913. Decrypt checking is omitted for encrypted columns that have the decrypt default property because the DECRYPT protection check requests for those columns have been removed from the list of PCRs by the normalizer. Before processing rows, for each symmetric key required for the decryption operation at run time, at step 914 the unit decrypts the key using a static key derived from the system/user password as described above under sp_encryption. The decrypted key is cached in the execution plan. (If the user password has not been set, the unit sets a bit in the encryption key's runtime context in the plan. Error reporting is deferred as noted in the below discussion of step 917a). For each row of data, at step 915, the execution unit invokes one of two actions on the encrypted column data based on whether or not the encrypted column data has the decrypt default property. If the encrypted column has the decrypt default property, the process proceeds as indicated at step 916. Otherwise, it proceeds to step 917. If the encrypted column has the decrypt default attribute, the unit calls the decrypt_perm( ) built-in function at step 916a. The function instantiates a DECRYPT protection check request and calls normal permission checking functions to determine whether the user has implicit or explicit decrypt permission on the given column at step 916b. According to the result of this function call, at step 916c the execution unit proceeds either to step 916c or to step 917. If the user has decrypt permission the execution unit proceeds to execute the decryption logic at step 917. Otherwise, at step 916c the unit branches to an instruction to load the decrypt default constant value into the set of return values for the current row or feeds it into any user-defined expression that produces the return value. If the column does not have the decrypt default property or if the decrypt_perm( ) built-in determines the user has decrypt permission, at step 917a the unit invokes the encryption module to execute the E_COLDECRYPT instruction on each encrypted column read from the database. (If the encryption key could not be decrypted because of a missing password at indicated above in the discussion of step 914, an error is reported at this point). At step 917b, decryption is done using the associated key value cached in the plan and according to properties defined by create encryption key (such as use of initialization vector or random padding). At the end of processing all rows, the encryption key values in memory may be erased, as indicated at step 917c.

If the DML statement references encrypted columns with the decrypt default property in a WHERE clause expression, the decrypt_perm( ) built-in is evaluated once and its result is saved for use in qualifying each row of the result set. If the saved decrypt_perm( ) result indicates that the user does not have decrypt permission, the execution unit omits the search and automatically evaluates the individual WHERE clause expression as false. If the saved decrypt_perm( ) result indicates that the user has decrypt permission, the WHERE clause on the encrypted column is executed.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system, a method for providing automated encryption support for column data which handles requests for encrypted column data from users without decrypt permission, the method comprising:
    defining Structured Query Language (SQL) extensions for creating and managing column encryption keys, and for creating and managing database tables with encrypted column data;
    receiving an SQL statement that uses said SQL extensions to specify creation of a particular column encryption key for encrypting column data;
    receiving at least one SQL statement that uses said SQL extensions to specify creation of a database table having particular column data encrypted with said particular column encryption key and having a default value to be provided in response to requests for said particular column data from a user without decryption permission;
    upon parsing said SQL statements, creating a database table having particular column data encrypted with said particular encryption key, and storing a decrypt default attribute that associates said default value with said particular column data;
    in response to a subsequent database operation requesting the particular column data that has been encrypted from a user with decrypt permission on said particular column data, automatically decrypting the particular column data for use by the database operation; and
    in response to a subsequent database operation requesting the particular column data that has been encrypted from a user without decrypt permission, returning the default value specified for the particular column data by the decrypt default attribute.

2. The method of claim 1, wherein columns that are not specified to be encrypted are stored in unencrypted format, for minimizing encryption overhead.

3. The method of claim 1, wherein the automated encryption support operates as an internal built-in feature of the database system, without use of an add-on library.

4. The method of claim 1, wherein the SQL statement specifying creation of a database table having particular column data encrypted comprises a CREATE TABLE command that allows specification of one or more columns to be encrypted.

5. The method of claim 4, wherein the CREATE TABLE command includes an attribute enabling a default value to set for the particular column data encrypted, said default value to be returned to users without decrypt permission.

6. The method of claim 1, further comprising:
    receiving an SQL statement specifying alteration of a previously-created database table so as to encrypt particular column data.

7. The method of claim 6, wherein the SQL statement specifying alteration of a previously created database table comprises an ALTER TABLE command.

8. The method of claim 7, wherein the ALTER TABLE command includes an attribute enabling a default value to set for the particular column data encrypted, said default value to be returned to users without decrypt permission.

9. The method of claim 1, wherein the encryption support works with existing database applications without requiring changes to said existing database applications.

10. The method of claim 9, wherein the default value is returned to users of said existing database applications without decrypt permission, thereby avoiding return of an error message to users without decrypt permission.

11. The method of claim 1, further comprising:
after creation of the particular column encryption key, protecting the particular column encryption key with a user-supplied password.

12. The method of claim 11, wherein the user-supplied password must be supplied before the system allows use of the particular column encryption key for database operations.

13. The method of claim 11, wherein a user seeking to decrypt column data must supply said user-supplied password and must have necessary database privileges before decrypting the column data with the particular column encryption key.

14. The method of claim 1, wherein the database system internally stores in encrypted format any column encryption keys that have been created.

15. The method of claim 1, wherein a single column encryption key is used for each column to be encrypted.

16. The method of claim 1, wherein a single column encryption key may be shared by multiple columns to be encrypted.

17. The method of claim 1, wherein the particular column encryption key is itself encrypted to a key-encrypting key constructed from a user-supplied password.

18. The method of claim 17, wherein the particular column encryption key is itself stored on disk in encrypted format using Advanced Encryption Standard (AES) encryption.

19. The method of claim 1, wherein said Structured Query Language (SQL) extensions for creating and managing column encryption keys include a clause for instructing the database system to create a default key for encrypting columns.

20. A computer-readable medium having processor-executable instructions for performing the method of claim 1.

21. A database system providing automated encryption support for column data, the system comprising:
a parser that supports Structured Query Language (SQL) extensions for creating and managing column encryption keys, and for creating and managing database tables with encrypted column data; and
an execution unit, operating in response to SQL statements parsed by the parser,
for creating in response to SQL extensions present in the SQL statements a particular column encryption key,
for creating in response to SQL extensions present in the SQL statements a database table having particular column data encrypted with said particular column encryption key and having a default value to be provided in response to requests for said particular column data from a user without decryption permission,
for storing a decrypt default attribute that associates said default value with said particular column data, and
for automatically decrypting the particular column data for use by a subsequent database operation that requests the particular column data that has been encrypted from a user with decrypt permission on said particular column data, and which provides the default value specified for the particular column data by the decrypt default attribute in response to a subsequent database operation requesting the particular column data from a user without decrypt permission.

22. The system of claim 21, wherein columns that are not specified to be encrypted are stored in unencrypted format, for minimizing encryption overhead.

23. The system of claim 21, wherein the automated encryption support operates as an internal built-in feature of the database system, without use of an add-on library.

24. The system of claim 21, wherein the SQL statement specifying creation of a database table having particular column data encrypted comprises a CREATE TABLE command that allows specification of one or more columns to be encrypted.

25. The system of claim 24, wherein the CREATE TABLE command includes an attribute enabling a default value to set for the particular column data encrypted, said default value to be returned to users without decrypt permission.

26. The system of claim 21, further comprising:
a module for receiving an SQL statement specifying alteration of a previously created database table so as to encrypt particular column data.

27. The system of claim 26, wherein the SQL statement specifying alteration of a previously created database table comprises an ALTER TABLE command.

28. The system of claim 27, wherein the ALTER TABLE command includes an attribute enabling a default value to set for the particular column data encrypted, said default value to be returned to users without decrypt permission.

29. The system of claim 21, wherein the execution unit with encryption support with existing database applications without requiring changes to said existing database applications.

30. The system of claim 29, wherein the execution unit returns the default value to users of said existing database applications without decrypt permission, thereby avoiding return of an error message to users without decrypt permission.

31. The system of claim 21, wherein the system protects the particular column encryption key with a user-supplied password.

32. The system of claim 31, wherein the user-supplied password must be supplied before the system allows use of the particular column encryption key for database operations.

33. The system of claim 31, wherein a user seeking to decrypt column data must supply said user-supplied password and must have necessary database privileges before decrypting the column data with the particular column encryption key.

34. The system of claim 21, further comprising:
providing a command to grant decryption permission to others.

35. The system of claim 21, wherein the database system internally stores in encrypted format any column encryption keys that have been created.

36. The system of claim 21, wherein the database system stores encrypted column data internally as variable binary (VARBINARY) data.

37. The system of claim 21, wherein the database system presents users a user-defined field type for column data that has been encrypted, even though the column data is stored internally as variable binary data.

38. The system of claim 21, wherein the database system preserves any user-defined data type for the particular column data so that the database system employs a correct data type for processing queries and returning query results.

39. The system of claim 38, wherein the database system stores the user-defined data type for the particular column data in a system catalog of the database system.

40. The system of claim 21, wherein a single column encryption key is used for each column to be encrypted.

41. The system of claim 21, wherein the particular column encryption key is itself encrypted to a key-encrypting key constructed from a user-supplied password.

42. The system of claim 41, wherein the particular column encryption key is itself stored on disk in encrypted format using Advanced Encryption Standard (AES) encryption.

43. The system of claim 21, wherein said Structured Query Language (SQL) extensions for creating and managing column encryption keys include a clause for instructing the database system to create a default key for encrypting columns.

* * * * *